(12) United States Patent
Takashima et al.

(10) Patent No.: US 8,042,188 B2
(45) Date of Patent: Oct. 18, 2011

(54) INFORMATION PROCESSING APPARATUS, INFORMATION RECORDING MEDIUM MANUFACTURING APPARATUS, INFORMATION RECORDING MEDIUM, METHOD AND COMPUTER PROGRAM

(75) Inventors: Yoshikazu Takashima, Tokyo (JP); Kenjiro Ueda, Tokyo (JP); Tateo Oishi, Tokyo (JP); Katsumi Muramatsu, Tokyo (JP); Jun Yonemitsu, Tokyo (JP)

(73) Assignee: Sony Corporation, Tokyo (JP)

( * ) Notice: Subject to any disclaimer, the term of this patent is extended or adjusted under 35 U.S.C. 154(b) by 1274 days.

(21) Appl. No.: 11/513,015

(22) Filed: Aug. 31, 2006

(65) Prior Publication Data

US 2007/0076870 A1    Apr. 5, 2007

Related U.S. Application Data

(60) Provisional application No. 60/712,388, filed on Aug. 31, 2005.

(30) Foreign Application Priority Data

Jul. 15, 2005    (JP) ................................. 2005-207852

(51) Int. Cl.
G06F 7/04     (2006.01)
G06F 17/30    (2006.01)
H04N 7/16     (2011.01)
(52) U.S. Cl. .......................................... 726/26; 713/189
(58) Field of Classification Search .................... 726/26; 713/189
See application file for complete search history.

(56) References Cited

U.S. PATENT DOCUMENTS

| | | | | |
|---|---|---|---|---|
| 6,259,801 B1 * | 7/2001 | Wakasu | .................. | 382/100 |
| 6,334,189 B1 * | 12/2001 | Granger et al. | .................. | 726/26 |
| 6,430,376 B1 * | 8/2002 | Yamamoto | .................. | 396/429 |
| 6,643,775 B1 * | 11/2003 | Granger et al. | .................. | 713/190 |
| 6,707,927 B1 * | 3/2004 | Kita et al. | .................. | 382/100 |
| 7,007,025 B1 * | 2/2006 | Nason et al. | .................. | 707/9 |

(Continued)

FOREIGN PATENT DOCUMENTS

JP    11-45508    2/1999

(Continued)

OTHER PUBLICATIONS

U.S. Appl. No. 11/234,693, filed Sep. 23, 2005, Takashima, et al.

(Continued)

*Primary Examiner* — David Garcia Cervetti
(74) *Attorney, Agent, or Firm* — Oblon, Spivak, McClelland, Maier & Neustadt, L.L.P.

(57) ABSTRACT

To provide an apparatus, a recording medium and a method for effectively preventing unauthorized use of a content. A content containing broken data different from correct content member data is recorded on an information recording medium. Furthermore, transform data, as the correct member data, to be substituted for the broken data, and a fix-up table storing setting position information of the content are recorded on the information recording medium. During the content playback process, the transform data is substituted for the content member data in accordance with the fix-up table recorded on the information recording medium. With this arrangement, even if the encryption key corresponding to the encrypted content recorded on the information recording medium is leaked, an apparatus unable to acquire the transform data cannot play back the content. Unauthorized use of the content is thus controlled.

27 Claims, 29 Drawing Sheets

U.S. PATENT DOCUMENTS

| | | | |
|---|---|---|---|
| 7,057,666 B2 * | 6/2006 | Folio | 348/473 |
| 7,076,770 B2 * | 7/2006 | Handal | 717/136 |
| 7,120,470 B2 * | 10/2006 | Oota et al. | 455/566 |
| 7,159,117 B2 * | 1/2007 | Tanaka | 713/176 |
| 7,170,999 B1 * | 1/2007 | Kessler et al. | 380/277 |
| 7,263,722 B1 * | 8/2007 | Luo et al. | 726/26 |
| 7,333,716 B2 * | 2/2008 | Kuroda | 386/252 |
| 7,385,131 B2 * | 6/2008 | Clift | 84/609 |
| 7,496,282 B2 * | 2/2009 | Kochale | 386/111 |
| 7,724,918 B2 * | 5/2010 | Balakrishnan et al. | 382/100 |
| 2001/0026616 A1 * | 10/2001 | Tanaka | 380/202 |
| 2001/0046298 A1 * | 11/2001 | Terada et al. | 380/252 |
| 2002/0126996 A1 * | 9/2002 | Kuroda | 386/94 |
| 2002/0194568 A1 * | 12/2002 | Kobayashi et al. | 714/763 |
| 2003/0112973 A1 * | 6/2003 | Tsutsui et al. | 380/46 |
| 2003/0190155 A1 * | 10/2003 | Tsutsui et al. | 386/111 |
| 2004/0062522 A1 * | 4/2004 | Kitora et al. | 386/46 |
| 2004/0160991 A1 * | 8/2004 | Bretl et al. | 370/509 |
| 2005/0002531 A1 * | 1/2005 | Michaelsen | 380/268 |
| 2005/0071664 A1 * | 3/2005 | de Jong | 713/200 |
| 2005/0108559 A1 * | 5/2005 | Suzuki et al. | 713/193 |
| 2005/0152411 A1 * | 7/2005 | Breti et al. | 370/535 |
| 2005/0260002 A1 * | 11/2005 | Masui | 399/12 |
| 2005/0286612 A1 * | 12/2005 | Takanashi | 375/147 |
| 2006/0026430 A1 * | 2/2006 | Luo | 713/176 |
| 2006/0195703 A1 * | 8/2006 | Jakubowski | 713/190 |
| 2006/0235798 A1 * | 10/2006 | Alkove et al. | 705/59 |
| 2006/0247910 A1 * | 11/2006 | Kobayashi et al. | 703/24 |
| 2007/0044640 A1 * | 3/2007 | Clift | 84/609 |
| 2007/0055931 A1 * | 3/2007 | Zaima et al. | 715/526 |
| 2007/0112685 A1 * | 5/2007 | Yamamichi | 705/64 |
| 2007/0156506 A1 * | 7/2007 | Hara | 705/10 |
| 2007/0266274 A1 * | 11/2007 | Lin | 714/699 |
| 2008/0210747 A1 * | 9/2008 | Takashima | 235/375 |
| 2009/0022165 A1 * | 1/2009 | Candelore et al. | 370/400 |
| 2009/0055189 A1 * | 2/2009 | Stuart et al. | 704/270 |
| 2009/0092244 A1 * | 4/2009 | Terada et al. | 380/28 |

FOREIGN PATENT DOCUMENTS

| | | |
|---|---|---|
| JP | 2002-117248 | 4/2002 |
| JP | 2002-278859 | 9/2002 |
| JP | 2003-208755 | 7/2003 |
| JP | 2006-126554 | 5/2006 |

OTHER PUBLICATIONS

U.S. Appl. No. 12/713,762, filed Feb. 26, 2010, Ueda, et al.
U.S. Appl. No. 13/006,157, filed Jan. 13, 2011, Takashima.

* cited by examiner

FIG. 9

| FixUpTable() { | Bits | Description |
|---|---|---|
| Number of FixUpEntry | 32 | Number of FixUpEntry |
| FixUpEntry Length | 8 | Byte Length of one FixUpEntry() = (N+6) |
| reserved | 8 | Reserve |
| FixUpEntry(){ | | |
| SPN | 32 | Absolute Transformed Packet Number from the beginning of AV Stream File |
| Byte Offset | 8 | Start byte position of transformed data in the packet |
| player_id_bit_position | 8 | Indicate bit position of Player ID for forensic mark |
| FixUp Data | 8xN | Value to be overwritten (N bytes are transformed in one TS packet) |
| } | | |

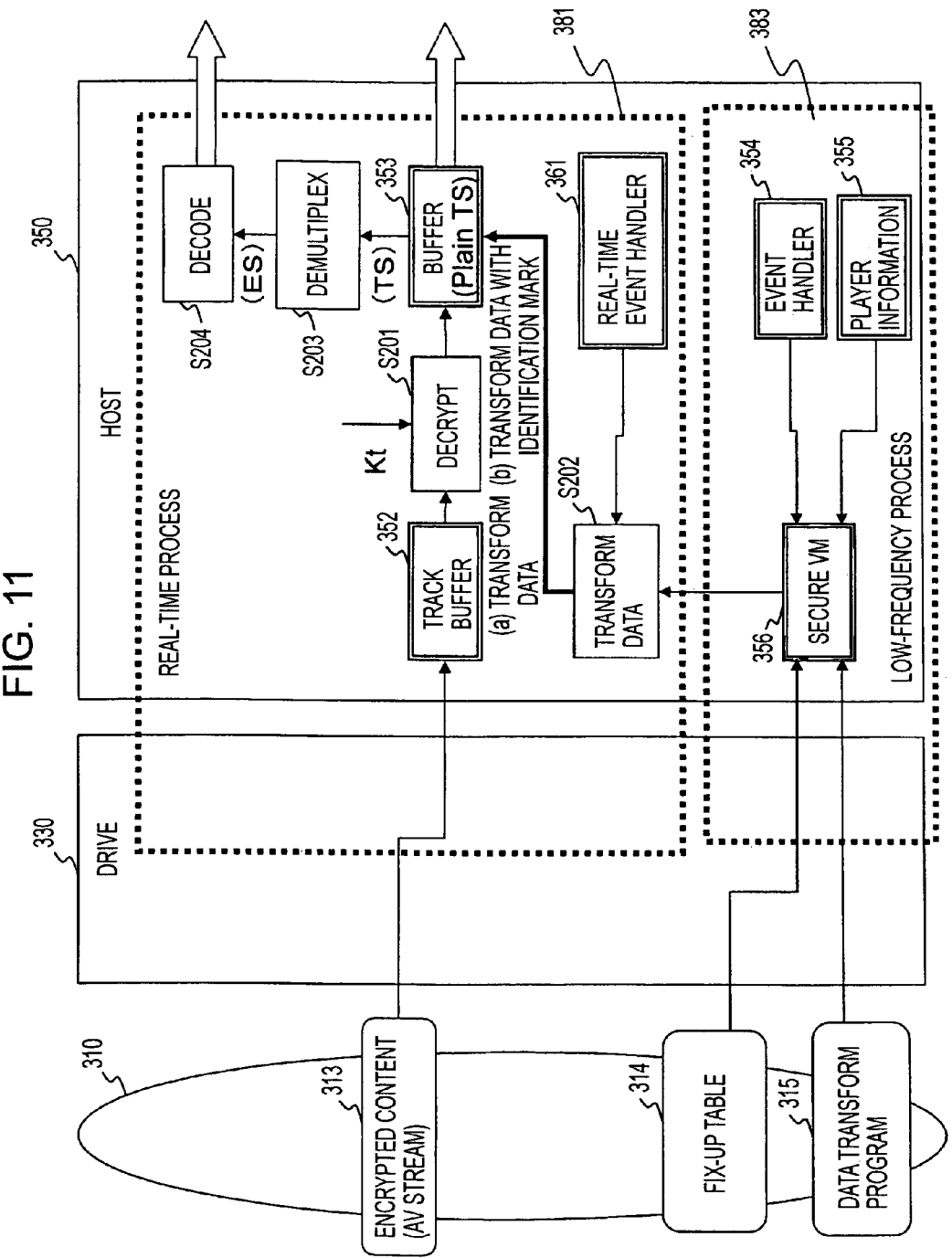

FIG. 12

| FixUpTable() { | Bits | Description |
|---|---|---|
| Number of FUT blocks | 16 | Number of FUT Blocks (=$N_{FUT}$) |
| Length of FUT block | 16 | Byte Length of one FUT block (=$N_b$) |
| Number of FixUpEntry in FUT block | 32 | Number of FixUpEntry in one FUT block() (=$N_{entry}$) |
| Length of one FixUpEntry | 8 | Byte Length of one FixUpEntry() |
| For(I=1; I< $N_{FUT}$; I++){ | | |
| First SPN for FUT block | 32 | Absolute Transformed Packet Number of 1st FUT entry in each FUT block |
| } | | Reserve |
| reserved | | |
| For(I=1; I< $N_{FUT}$; I++){ | | |
| FUT block() | $N_b$ x $N_{FUT}$ | Each block is obfuscated separately |
| } | | |

FIG. 13

| FUT block() { | Bits | Description |
|---|---|---|
| For(l=1; l< N_entry ; l++){ | | |
| FixUpEntry(){ | | |
| SPN | 32 | Absolute Transformed Packet Number from the beginning of AV Stream File |
| Byte Offset | 8 | Start byte position of transformed data in the packet |
| FM_flag | 1 | 0: apply modification at all players<br>1: apply modification only if the player_id_bit is matched |
| player_id_bit_position | 7 | 0~127 to indicate the player id bit position for Forensic Mark |
| FixUp Data | 8xN | Value to be overwritten (N bytes are transformed in one TS Packet) |
| } | | |
| } | | |

FIG. 19

| Field | Bits | Description |
|---|---|---|
| SP_No | 8 | ID for SP value to be used for XOR of FUT (This value is not XORed) |
| type_indicator | 2 | 00b:no transform, 01b:transform, 10b and 11b:forensic mark |
| FM_ID_bit_position | 6 | Indicate bit position of Player ID for forensic (MSB is second bit of type_indicator) |
| relative_SPN | 12 | Relative packet number from PMT to transformed packet |
| byte_position | 8 | Start byte position of transformed data in the packet (more than 5) |
| overwrite_value | 5x8 | Value to be overwritten |
| relative_SPN_2 | 12 | Relative packed number from PMT to second transformed packet |
| byte_position_2 | 8 | Start byte position of transformed data in the second packet |
| overwrite_value_2 | 5x8 | Second value to be overwritten |

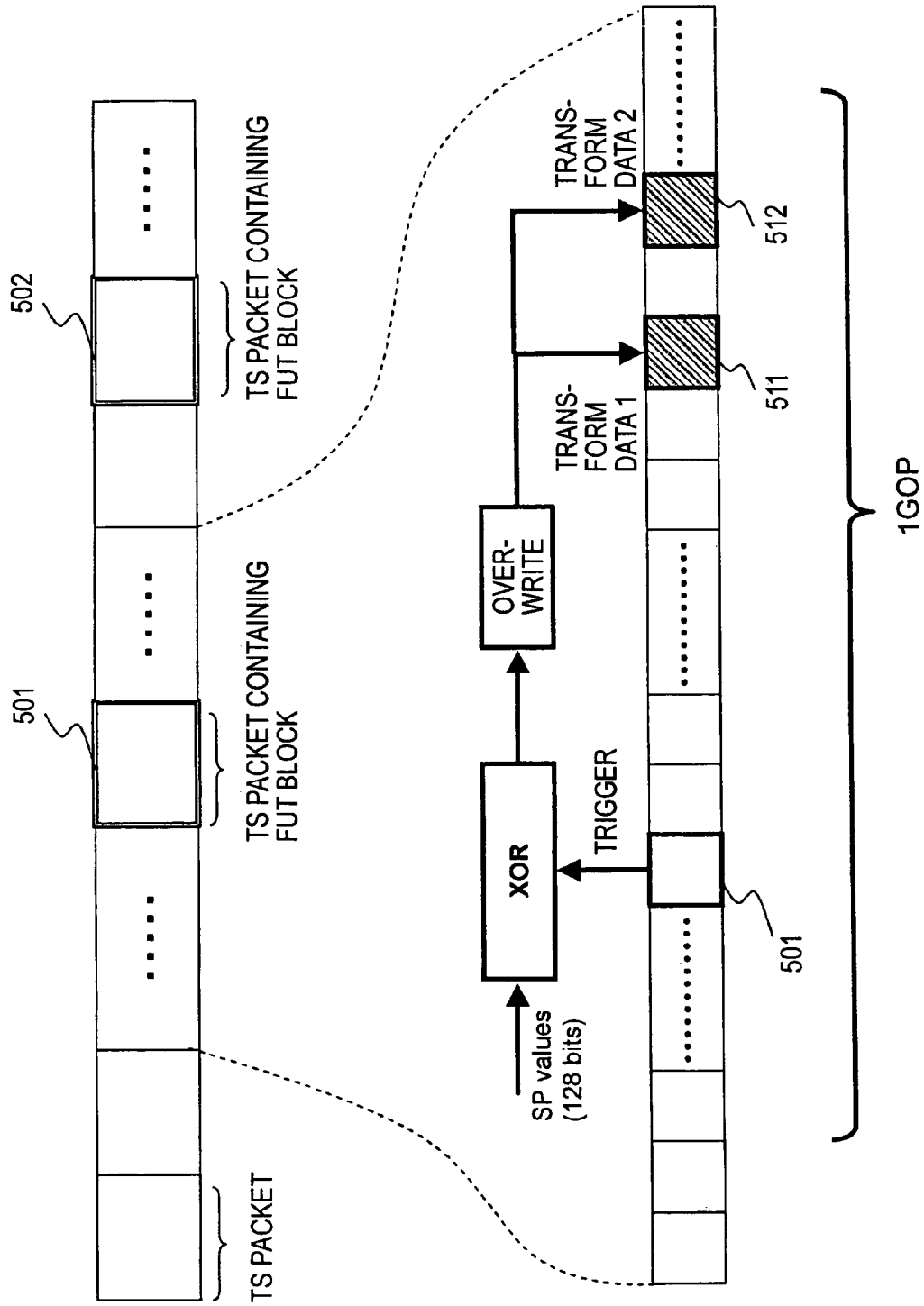

FIG. 24

| FixUpTable() { | Bits | Description |
|---|---|---|
| Number of FUT blocks | 16 | Number of FUT Blocks (=$N_{FUT}$) |
| Length of FUT block | 16 | Byte Length of one FUT block (=$N_b$) : may be fixed by the format |
| For(l=1; l< $N_{FUT}$; l++){ | | |
| SP_No | 8 | Indicates the SP_No which is associated with SP value generated by VM |
| reserved | 8 | |
| First SPN for FUT block | 32 | Absolute Transformed Packet Number of 1st FUT entry in each FUT block |
| } | | |
| reserved | | |
| For(l=1; l< $N_{FUT}$; l++){ | | |
| FUT block() | $N_b \times N_{FUT}$ | Each block is obfuscated separately |
| } | | |

FIG. 25

| FUT block() {                          | Bits              | Description                                                                                                                           |
|----------------------------------------|-------------------|---------------------------------------------------------------------------------------------------------------------------------------|
| Number of FixUpEntry in this block     | 32                | Number of FixUpEntry in this block (= $N_{Fixups}$)                                                                                   |
| For(I=1; I < $N_{Fixups}$; I++){       |                   |                                                                                                                                       |
| Base SPN for FixUpEntry                | 32                | Absolute Transformed Packet Number from which relative FixUpEntry values will be computed                                             |
| }                                      |                   |                                                                                                                                       |
| Reserved                               |                   |                                                                                                                                       |
| For(I=1; I < $N_{Fixups}$; I++){       |                   |                                                                                                                                       |
| FixUpEntry()                           | 128 x $N_{Fixups}$ | Each block is obfuscated separately using the same SP XOR process as option (A) and has the same format as FUTs in option (A)        |
| }                                      |                   |                                                                                                                                       |

FIG. 26

| FixUpEntry() { | Bits | Description |
|---|---|---|
| type_indicator | 2 | 00b:no transform, 01b:transform, 10b and 11b:forensic |
| FM_ID_bit_position | 6 | Indicate bit position of Player ID for forensic (MSB is second bit of type_indicator) |
| relative_SPN | 12 | Relative packet number from PMT to transformed packet |
| byte_position | 8 | Start byte position of transformed data in the packet (more than 5) |
| overwrite_value | 5x8 | Value to be overwritten |
| relative_SPN_2 | 12 | Relative packed number from PMT to second transformed packet |
| byte_position_2 | 8 | Start byte position of transformed data in the second packet |
| overwrite_value_2 | 5x8 | Second value to be overwritten |
| } | | |

FIG. 28

| FixUpTable() { | Bits | Description |
|---|---|---|
| Number of FUT blocks | 16 | Number of FUT Blocks (=NFUT) |
| Length of FUT block | 16 | Byte Length of one FUT block (=$N_b$) : may be fixed by the format |
| For(SP_No=0; SP_No< $N_{FUT}$ ; SP_No++){ | | |
| FUT block() | $N_b$ x $N_{FUT}$ | Each block is obfuscated separately |
| } | | |

INFORMATION PROCESSING APPARATUS, INFORMATION RECORDING MEDIUM MANUFACTURING APPARATUS, INFORMATION RECORDING MEDIUM, METHOD AND COMPUTER PROGRAM

CROSS-REFERENCE TO RELATED APPLICATIONS

This application claims priority to Provisional Application Ser. No. 60/712,388 filed Aug. 31, 2005 and claims priority to JP 2005-207852, filed Jul. 15, 2005.

TECHNICAL FIELD

The present invention relates to a method and apparatus for processing information, a method and apparatus for manufacturing an information recording medium, the information recording medium and a computer program. More specifically, the present invention relates to a method and apparatus for processing information, a method and apparatus for manufacturing an information recording medium, the information recording medium and a computer program for performing a data transform process on a variety of contents to be used and managed in order to prevent unauthorized use of the contents and to permit strictly controlled use and management on the contents.

BACKGROUND ART

A variety of software data (hereinafter referred to as a content) including audio data such as music, image data such as movies, game programs, and a variety of software programs is recorded as digital data on recording media including Blu-ray disk employing blue laser, a DVD (digital versatile disk), an MD (Mini Disk), and a CD (compact disk). The Blu-ray disk employing blue laser has a high recording density and records video contents of a large amount-of data as high image quality data.

The variety of information recording media with the digital content recorded thereon is supplied to users. Each user plays back and uses the content on the user's own personal computer, disk player, etc.

The distribution right of a majority of contents including music data and video data is held by the creators or sellers of the contents. A certain limitation is imposed on the distribution of the contents, in other words, an authorized user only has the right to use the corresponding content, and unauthorized copying of a content is typically inhibited.

Digital recording apparatuses and recording media are currently in widespread use. A digital recording apparatus and a digital recording medium allow a movie or audio to be repeatedly recorded or replayed without any quality drop involved. Unauthorized copied contents are distributed over the internet, contents copied on a CD-R, so-called pirated disk, are distributed, and unauthorized copied contents stored on a hard disk in a computer are used. Use of unauthorized copied contents becomes a concern.

A large capacity recording medium, such as a DVD or a recently developed recording media using blue laser, can digitally record a large amount of data as large as a single movie to several movies in one piece of medium. To protect copyright of a content from unauthorized copying becomes more and more important considering that video information is easily recorded as digital information. A variety of techniques for protecting digital data from unauthorized copying is incorporated in a digital recording apparatus and a recording medium.

For example, the content scramble system is used in DVD disk players. In the content scramble system, video data or audio data is recorded on a DVD-ROM (read only memory) in the encrypted form thereof. By descrambling the data, the content is played back.

In the descrambling process, a key for decrypting the encrypted data is provided to a licensed DVD player only. A license is given a DVD player that is designed to follow an operation rule in which no authorized copying is performed. The licensed DVD player decrypts the encrypted data on the DVD-ROM using a given key, thereby replaying an image or sound from the DVD-ROM.

Since unlicensed DVD players hold no particular data, such as the key for decrypting the data, the encrypted data recorded on the DVD-ROM cannot be decrypted. In the content scramble system, any DVD player failing to satisfy licensing requirements cannot replay digital data from the DVD-ROM. Unauthorized copying is thus prevented.

In the content scramble system, workload increases on an information processing apparatus as a user device executing a playback process. There are many known content scramble systems in which a scramble method has already been deciphered and is available via communications means such as the Internet. Once the scramble method is deciphered, the contents are played back and copied using unauthorized descramble process. The copyright of the content and the right to use the content are thus violated.

DISCLOSURE OF THE INVENTION

Problems to be Solved by the Invention

The present invention has been developed in view of this situation, and it is an object to provide a method and apparatus for processing information, a method and apparatus for manufacturing an information recording medium, the information recording medium and a computer program for performing mainly data substitution in a data transform process to reduce workload on the information processing apparatus, control unauthorized use of contents, and identify a device if an authorized use is performed on that device.

Means for Solving the Problems

In accordance with a first aspect of the present invention, an information processing apparatus for playing back a content recorded on an information recording medium, includes a data transform processor performing a substitution process on content member data recorded on the information recording medium, wherein the data transform processor substitutes transform data as substitute data for the content member data in accordance with a fix-up table holding recording position information of the transform data.

In accordance with the information processing apparatus of one embodiment of the present invention, the data transform processor substitutes the transform data composed of authorized content data for broken data different from an authorized content recorded on the information recording medium.

In accordance with the information processing apparatus of one embodiment of the present invention, the data transform processor substitutes, for a portion of the content recorded on the information recording medium, the transform data containing data for analyzing member bits of identification information identifying one of a content playback apparatus and a content playback application program.

In accordance with the information processing apparatus of one embodiment of the present invention, the data transform processor acquires the transform data as the substitute data by performing one of a calculation process and an encryption process, the one of the calculation process and the encryption process applying different parameters to partial fix-up tables that hold the transform data corresponding to only a part of the member data of the content.

In accordance with the information processing apparatus of one embodiment of the present invention, the data transform processor acquires the transform data as substitute data by performing an exclusive OR gating process with different parameters applied to partial fix-up tables that hold the transform data corresponding to only a part of the member data of the content.

In accordance with the information processing apparatus of one embodiment of the present invention, the data transform processor performs a calculation process of calculating the different parameters as an intermittent process in synchronization with one of a playback process of playing back the content and an output process of outputting the content to the outside, and acquires the transform data corresponding to different content member data through one of the calculation process and the encryption process performed in accordance with the intermittently calculated different parameters.

In accordance with the information processing apparatus of one embodiment of the present invention, the data transform processor performs the parameter calculation process using a virtual machine.

In accordance with the information processing apparatus of one embodiment of the present invention, the data transform processor acquires the fix-up table from the information recording medium having the content recorded thereon, and analyzes, based on the fix-up table, the transform data as the substitute data, and the recording position information of the transform data.

In accordance with the information processing apparatus of one embodiment of the present invention, the data transform processor successively acquires divisional fix-up tables distributed in member packets of the content recorded on the information recording medium, and acquires, from the divisional fix-up tables, the transform data as the substitute data corresponding to a part of the member data of the content, and the recording position information of the transform data.

In accordance with the information processing apparatus of one embodiment of the present invention, the information processing apparatus further includes a decrypt processor for executing a decryption process on the content recorded on the information recording medium, wherein the data transform processor substitutes the transform data for the content member data of a decrypted content from the decrypt processor.

In accordance with a second aspect of the present invention, an information recording medium manufacturing apparatus includes a data processor for generating a content containing broken data different from authorized content member data, a fix-up table holding transform data as the authorized content member data that is substituted for the broken data, and having setting position information regarding the content of the transform data, and a data transform program containing an execution command of executing a substitution process on the content member data with the fix-up table applied, and a data recorder for recording the content containing the broken data, the fix-up table, and the data transform program onto an information recording medium.

In accordance with the information recording medium manufacturing apparatus of one embodiment of the present invention, the data processor generates the fix-up table holding the transform data therewithin selectively applied based on identification information of one of a content playback apparatus and a content playback application program, and the data recorder records the fix-up table holding the transform data that is selectively applied based on the identification information.

In accordance with the information recording medium manufacturing apparatus of one embodiment of the present invention, the data processor generates the fix-up table that is obfuscated using one of a calculation process and an encryption process, the one of the calculation process and the encryption process applying different parameters to partial fix-up tables that hold the transform data corresponding to only a part of the member data of the content, and the data recorder records the obfuscated fix-up table.

In accordance with the information recording medium manufacturing apparatus of one embodiment of the present invention, the data processor generates content data in which the obfuscated fix-up table is dispersed in stream packets of the content containing the broken data, and the data recorder records the content data containing the obfuscated fix-up table dispersed therewithin.

In accordance with a third aspect of the present invention, an information recording medium holding data, stores transform data that is substituted for a portion of the held data, a fix-up table containing setting position information regarding a content of the transform data, and a data transform program containing an execution command of executing a substitution process on the content member data with the fix-up table applied.

In accordance with the information recording medium of one embodiment of the present invention, registration information of the fix-up table includes a type identifier identifying which of registration information (a) and registration information (b) is included, wherein the registration information (a) relates to the transform data for transforming broken data into authorized content data and the registration information (b) relates to the transform data containing an identification mark for embedding identification information of one of a content playback apparatus and a content playback application program.

In accordance with the information recording medium of one embodiment of the present invention, if the registration information of the fix-up table is related to the transform data containing the identification mark for embedding the identification information of the one of the playback apparatus and the content playback application program, the registration information of the fix-up table further includes the transform data that is selectively applied based on the identification information of the one of the content playback apparatus and the content playback application program.

In accordance with the information recording medium of one embodiment of the present invention, the fix-up table includes position information of a bit, to be referenced to determine a process mode, from among a plurality of bits of the identification information of the one of the playback apparatus and the playback application program.

In accordance with the information recording medium of one embodiment of the present invention, the fix-up table is obfuscated using one of a calculation process and an encryption process, the one of the calculation process and the encryption process applying different parameters to partial fix-up tables that hold the transform data corresponding to only a part of the member data of the content.

In accordance with the information recording medium of one embodiment of the present invention, the information recording medium further stores, as record data, content data in which the obfuscated fix-up table is dispersed in stream packets of the content containing the broken data.

In accordance with a fourth aspect of the present invention, a data structure includes transform data to be substituted for a portion of content data, and a fix-up table containing setting position information of a content of the transform data, wherein registration information of the fix-up table includes a type identifier identifying which of registration information (a) and registration information (b) is included, wherein the registration information (a) relates to the transform data for transforming broken data into authorized content data and the registration information (b) relates to the transform data containing an identification mark for embedding identification information of one of a content playback apparatus and a content playback application program.

In accordance with the data structure of one embodiment of the present invention, if the registration information of the fix-up table is related to the transform data containing the identification mark for embedding the identification information of the one of the playback apparatus and the content playback application program, the registration information of the fix-up table further includes the transform data that is selectively applied based on the identification information of the one of the content playback apparatus and the content playback application program.

In accordance with the data structure of one embodiment of the present invention, the fix-up table includes a data storage area for identifying a bit, to be converted, from among a plurality of bits of the identification information of the one of the playback apparatus and the playback application program.

In accordance with the data structure of one embodiment of the present invention, the fix-up table is obfuscated using one of a calculation process and an encryption process, the one of the calculation process and the encryption process applying different parameters to partial fix-up tables that hold the transform data corresponding to only a part of the member data of the content.

In accordance with a fifth aspect of the present invention, an information processing method of playing back a content recorded on an information recording medium, includes a data transform processing step of performing a substitution process on content member data recorded on the information recording medium, wherein the data transform processing step includes substituting transform data as substitute data for the content member data in accordance with a fix-up table holding recording position information of the transform data.

In accordance with the image process method of one embodiment of the present invention, the data transform processing step includes substituting the transform data composed of authorized content data for broken data different from an authorized content recorded on the information recording medium.

In accordance with the image processing method of one embodiment of the present invention, the data transform processing step includes substituting, for a portion of the content recorded on the information recording medium, the transform data containing data for analyzing member bits of identification information identifying one of a content playback apparatus and a content playback application program.

In accordance with the image process method of one embodiment of the present invention, the data transform processing step includes acquiring the transform data as the substitute data by performing one of a calculation process and an encryption process, the one of the calculation process and the encryption process applying different parameters to partial fix-up tables that hold the transform data corresponding to only a part of the member data of the content.

In accordance with the image process method of one embodiment of the present invention, the data transform processing step includes acquiring the transform data as the substitute data by performing an exclusive OR gating process with different parameters applied to partial fix-up tables that hold the transform data corresponding to only a part of the member data of the content.

In accordance with the image process method of one embodiment of the present invention, the data transform processing step includes performing a calculation process of calculating the different parameters as an intermittent process in synchronization with one of a playback process of playing back the content and an output process of outputting the content to the outside, and acquiring the transform data corresponding to different content member data through one of the calculation process and the encryption process performed in accordance with the intermittently calculated different parameters.

In accordance with the image process method of one embodiment of the present invention, the data transform processing step includes performing the parameter calculation process using a virtual machine.

In accordance with the image process method of one embodiment of the present invention, the data transform processing step includes acquiring the fix-up table from the information recording medium having the content recorded thereon, and analyzing, based on the fix-up table, the transform data as the substitute data, and the recording position information of the transform data.

In accordance with the image process method of one embodiment of the present invention, the data transform processing step includes acquiring successively divisional fix-up tables distributed in member packets of the content recorded on the information recording medium, and acquiring, from the divisional fix-up tables, the transform data as the substitute data corresponding to only a part of the member data of the content, and the recording position information of the transform data.

In accordance with the image process method of one embodiment of the present invention, the information processing method further includes a decrypt processing step of executing a decryption process on the content recorded on the information recording medium, wherein the data transform processing step comprises substituting the transform data for the content member data of the content decrypted in the decrypt processing step.

In accordance with a sixth aspect of the present invention, an information recording medium manufacturing method includes a data processing step of generating a content containing broken data different from authorized content member data, a fix-up table holding transform data as the authorized content member data that is substituted for the broken data, and having setting position information regarding the content of the transform data, and a data transform program containing an execution command of executing a substitution process on the content member data with the fix-up table applied, and a data recording step of recording the content containing the broken data, the fix-up table, and the data transform program onto an information recording medium.

In accordance with the information recording medium manufacturing method of one embodiment of the present invention, the data processing step includes generating the fix-up table holding the transform data therewithin selectively applied based on identification information of one of a content playback apparatus and a content playback application program, and the data recording step includes recording the fix-up table holding the transform data that is selectively applied based on the identification information.

In accordance with the information recording medium manufacturing method of one embodiment of the present invention, the data processing step includes generating the fix-up table that is obfuscated using one of a calculation process and an encryption process, the one of the calculation process and the encryption process applying different parameters to partial fix-up tables that hold the transform data corresponding to only a part of the member data of the content, and the data recording step includes recording the obfuscated fix-up table.

In accordance with the information recording medium manufacturing method of one embodiment of the present invention, the data processing step includes generating content data in which the obfuscated fix-up table is dispersed in stream packets of the content containing the broken data, and the data recording step includes recording the content data containing the obfuscated fix-up table dispersed therewithin.

In accordance with a seventh aspect of the present invention, a computer program for causing an information processing apparatus to playback a content recorded on an information recording medium, includes a data transform processing step of performing a substitution process on content member data recorded on the information recording medium, wherein the data transform processing step includes substituting transform data as substitute data for the content member data in accordance with a fix-up table holding recording position information of the transform data.

The computer program of the present invention is provided, to a general-purpose computer system executing a variety of program codes, in a computer-readable storage medium, such as a compact disk (CD), a floppy disk (FD), or a magneto-optic disk (MO), or via a communication medium such as network. By providing the computer program in a computer readable manner, the computer system performs process responsive to the computer program.

These and other features, and advantages of the present invention will become obvious from the following description of the present invention and the accompanying drawings. In the context of the description of the present invention, the system refers to a logical set of a plurality of apparatuses, and is not limited to an apparatus that houses elements within the same casing.

Advantages

In accordance with embodiments of the present invention, the content containing the broken data different from the authorized content member data is recorded onto the information recording medium. The transform data as the authorized content member data as a substitute for the broken data and the fix-up table containing the setting position information of the content of the transform data are further recorded onto the information recording medium. When the content is played back, the transform data is substituted for the content member data in accordance with the fix-up table recorded on the information recording medium. Even when an encryption key corresponding to an encrypted content recorded on the information recording medium is leaked, the content cannot be played back on an apparatus that fails to acquire the transform data. Unauthorized use of the content is thus prevented.

In accordance with embodiments of the present invention, the transform data includes the bit of the identification information identifying one of the content playback apparatus and the content playback application program. Should unauthorized content be leaked, a source of the unauthorized content is identified by analyzing the transform data.

In accordance with embodiments of the present invention, one of the calculation process and the encryption process is performed. In the one of the calculation process and the encryption process, different parameters are applied to divisional fix-up tables into which the fix-up table holding the transform data is divided. Even if one parameter is leaked, only a portion of the content is permitted to be played back. This arrangement reduces the possibility that the entire content is leaked.

Best Mode for Carrying Out the Invention

Referring to the drawings, a method and apparatus for processing information, a method and apparatus for manufacturing information recording medium, an information recording medium, and a computer program of the present invention are described in detail. The discussion includes the following sections.

1. Summary of storage data in the information recording medium, and processes of a drive and a host
2. Content management unit (CPS unit)
3. Content playback process
   (3.1) Content playback process 1
   (3.2) Content playback process 2
   (3.3) Content playback process 3
   (3.4) Content playback process 4
   (3.5) Content playback process 5
   (3.6) Content playback process 6
   (3.7) Content playback process 7
   (3.8) Content playback process 8
4. Structure of the information processing apparatus
5. Information recording medium manufacturing apparatus and information recording medium.

[1. Summary of Storage Data in the Information Recording Medium, and Processes of a Drive and a Host]

Summary of storage data in the information recording medium and processes of a drive and a host are described below. FIG. 1 illustrates an information recording medium 100, a drive 120, and a host 150. The host 150 is a data playback (or recording) application program, and runs on hardware of an information processing apparatus such as a personal computer in accordance with a predetermined data processing sequence.

The information recording medium 100, such as one of a Blu-ray disk and a digital versatile disk (DVD), is an information recording medium (such as a read-only memory (ROM) disk) storing an authorized content manufactured at a disk manufacturing plant under the permission of a holder of an authorized content copyright or distributorship or an information recording medium (RE disk) enabled to record data. In the following discussion of the embodiments, the information recording media is a disk-type medium. The present invention is applicable to a diversity of types of information recording media.

As shown in FIG. 1, the information recording medium 100 includes an encrypted content 101 that has undergone an encryption process and a partial data substitution process, an MKB (media key block) 102 as an encryption key block that is generated based on a key distribution system having a tree structure in one method of broadcast encryption, a title key file 103 composed of data (encrypted CPS unit key) that is an encrypted form of a title key applied to a content decryption process, use permission information 104 containing copy control information (CCI) as copy and playback control information as a content, a transform table (fix-up table) 105 having registered transform data corresponding to substitute data for a predetermined area in a content, and a data transform program 106 containing a process command for executing a data transform process in response to the registered transform data of the fix-up table 105. The data shown in FIG. 1 is one example only, and can be slightly different depending on the type of disk. These pieces of information are described below.

(1) Encrypted Content 101

The information recording medium 100 stores a variety of contents. For example, the information recording medium 100 stores contents including an AV (audio-visual) stream, such as HD (high-definition) moving image data, game programs defined in accordance with predetermined standards, image files, audio data, and text data. These contents are AV format standard data stored in accordance with a particular AV data format. More specifically, the contents are stored as Blu-ray disk ROM standard data in accordance with a Blu-ray disk ROM standard format.

Furthermore, the information recording medium 100 can store, as service data, a game program, an image file, audio data, and text data. These contents can be stored as data having a data format not in compliance with a particular AV data format.

The types of contents includes music data, video data such as still images, game programs, and WEB contents. These contents include a variety of information, such as content information that can be used in response to data from only the information recording medium 100, and content information that can be used by combining data from the information recording medium 100 and data supplied from a server via a network. The content stored in the information recording medium 100 is assigned keys different from segment content to segment content (referred to as CPS unit keys, simply unit keys (also referred to as title keys)) and then encrypted. The unit of content with one unit key assigned thereto is referred to a content management unit (CPS unit). The content may be broken data with a portion of the content replaced with data different from correct content data. Such a content cannot be played back in a decryption process alone. Data registered in the fix-up table must be substituted for the broken data. This process will be described later.

(2) MKB

The MKB (Medial Key Block) 102 is an encryption key block that is generated based on a key distribution system having a tree structure in one method of broadcast encryption. Only through a process (decryption process) based on a device key [Kd] stored in the information processing apparatus of a user holding effective license, the MKB 102 enables the acquisition of a media key [Km] required to decrypt a content. The MKB 102 is distributed in a layered tree structure information distribution system. Only when a user device (information processing apparatus) has effective license, the media key [Km] can be acquired. A user device, if revoked, is unable to acquire the media key [Km].

A control center, as a license entity, modifies a device key used to encrypt key information to be stored in the MKB so that decryption process with a device key stored in a particular user device cannot be performed. In other words, the control center generates the MKB that causes a media key to be unable to decrypt a content. The control center revokes an unauthorized device at any timing, and provides a decryptable encrypted content to only devices having effective license. The decryption process of the content will be described later.

(3) Title Key File

As previously discussed, a content or a set of a plurality of contents are encrypted with individual encryption keys (title keys or (CPS unit keys)) and stored in the information recording medium 100 for use and management. The audio-visual (AV) stream, the music data, the image data, such as moving images and still images, the game programs, and WEB contents are divided by unit as a content usage management unit, and different title keys are generated for respective divided units for the decryption process. Information for use in the generation of the title key is referred to as title key data. For example, the title key is generated by decrypting an encrypted title key with a key generated by the media key. In accordance with a predetermined encryption key generation sequence with the title key data applied thereto, the title key for each unit is generated and the content is then decrypted.

(4) Use Permission Information

The use permission information 104 includes copy and playback control information (CCI). More specifically, the use permission information 104 includes copy control information for controlling the use of the encrypted content 101 stored in the information recording medium 100 and playback control information for controlling the playback of the encrypted content 101. The copy and playback control information (CCI) is set in a variety of situations. For example, the CCI is set as individual information units of the CPS unit set, or is collectively set for a plurality of CPS units.

(5) Fix-Up Table

As previously discussed, the encrypted content 101 stored in the information recording medium 100 is encrypted in a predetermined encryption process, while a portion of the content member data is composed of broken data different from correct data. During a content playback operation, a data overwrite process is performed to substitute the transform data as the correct content data for the broken data. The table registering the transform data therewithin is the fix-up table. Many broken data units are dispersed within the content. During content playback, the transform data registered in the fix-up table is substituted for (overwrites) a plurality of broken data units. Even when an encryption key is leaked, leading to unauthorized decryption of the content, the decryption of the content alone fails to allow the correct content to be played back. Unauthorized use of the content is thus prevented.

The fix-up table 105 holds, in addition to standard transform data, the transform data that contains data used to analyze a bit of identification information identifying one of a content playback apparatus and a content playback application program. More specifically, the fix-up table 105 holds the "transform data containing an identification mark" containing a player ID serving as identification data of a player (an apparatus performing a host application program) or the identification information generated based on the player ID. The transform data containing the identification mark is data that is slightly modified in the number of bits from the correct content data within a range that does not affect the content playback. The process of using the transform data will be described more in detail later.

FIG. 1 illustrates the fix-up table 105 as a separate data file. Rather than being set as a separate file, the fix-up table 105 can be dispersed in packets of the encrypted content 101. The structure and the process of the fix-up table 105 will be described later.

(6) Data Transform Program

The data transform program 106 is used to execute a data transform process in accordance with the transform data of the fix-up table 105. A host apparatus executing the content playback performs the data transform program 106. More specifically, a data transform processor 154 of the host application 150 of FIG. 1 executes the data transform program 106.

In the host, a virtual machine (VM) executing the data transform process is set. The virtual machine executes the data transform program 106 read from the information recording medium 100, thereby applying the transform data of the fix-up table 105. The VM thus executes the data substitution process on a portion of the member data of the decrypted content. This process will be discussed more in detail later.

The structure and process of the host application 150 and the drive 120 are described below with reference to FIG. 1. The playback process of the content stored in the information recording medium 100 is performed by transferring data to the host application 150 via the drive 120. Before the use of the content, a mutual authentication process is performed between the drive 120 and the host application 150. After the drive 120 and the host application 150 have authenticated each other, the drive 120 transmits an encrypted content to the host application 150. The content is decrypted and then the data substitution process is performed in accordance with the fix-up table 105 in the host application 150. The content is thus played back.

In the mutual authentication process performed between the host application 150 and the drive 120, one device determines authentication of the other device by referencing a revocation list (invalidation list) issued by the control center. The revocation list indicates devices and applications registered as being unauthorized.

The drive 120 includes a memory 122 storing a host CRL (Certificate Revocation List) holding revoke information of a certificate of the host application 150 (public key certificate). The host application 150 includes a memory 152 storing a drive CRL (certificate revocation list) holding revoke information of a certificate of the drive 120 (public key certificate). The memory 122 and the memory 152 are non-volatile memories (NVRAM). If the CRL read from the information recording medium 100 is newer version, the data processor 121 and the data processor 151 perform update processes, thereby storing new version host CRL and drive CRL in the memories 122 and 152, respectively.

The CRL, such as the host CRL and the drive CRL, is successively updated by the control center. If a new unauthorized device is found, the control center issues an update CRL with a new entry, such as a certificate ID or a device ID issued for the unauthorized device, added thereto Each CRL is accompanied by a version number, and comparison between new and old versions is possible. For example, if a CRL read from an information recording medium and loaded onto the drive 120 is newer than the CRL stored in the memory 122 in the drive 120, the drive 120 executes the update process on the CRL. Likewise, the host application 150 performs the CRL update process.

In addition to the CRL update process, the data processor 121 in the drive 120 performs an authentication process with the host application 150 in the usage of the contents, a data read process of reading data from the information recording medium 100, and a data transfer process of transferring data to the host application 150.

As previously discussed, the host application 150 is an data playback (or recording) application executed in the information processing apparatus such as a personal computer. In accordance with a predetermined data processing sequence, the host application 150 executes the process thereof using information processing apparatus hardware such as a personal computer.

The host application 150 includes the data processor 151 performing the mutual authentication process and the data transfer control process with the drive 120, a decrypt processor 153 performing the decryption process of the encrypted content, a data transform processor 154 performing the data transform process based on the data registered in the fix-up table 105, and a decode processor 155 performing a decode process (such as an MPEG decode process).

The data processor 151 performs a host-drive authentication process. In the authentication process, the data processor 151 references the drive CRL stored in the memory a152 as the non-volatile memory (NVRAM), thereby determining that the drive 120 is not a revoked drive. The host application 150 performs the update process of storing the drive CRL of a new version in the memory a152.

The decrypt processor 153 generates a key applied to the decryption of the content by referencing a variety of information stored in the memory b156, and data read from the information recording medium 100. The decrypt processor 153 thus performs the decryption process on the encrypted content 101. In accordance with the data transform program acquired from the information recording medium 100, the data transform processor 154 performs the substitution process (overwrite process) on the data member of the content using the transform data registered in the fix-up table 105 acquired from the information recording medium 100. The decode processor 155 performs the decode process (for example, the MPEG decode process).

The memory b156 in the host application 150 stores the device key: Kd, key information applicable to the mutual authentication process and key information applicable to the decrypt process. The decryption process of the content will be described in detail later. The device key:Kd is a key applied to the process of the MKB. Only through the process (decryption process) based on the device key [Kd] stored in the information processing apparatus of the user holding effective license, the MKB enables the acquisition of the media key [Km] required to decrypt the content. During decryption of the encrypted content, the host application 150 performs the MKB process with the device key:Kd stored in the memory b156 applied. The decryption process of the content will be described in detail later.

[2. Content Management Unit (CPS Unit)]

As previously discussed, in the decryption process, the content stored in the information processing apparatus is stored with keys assigned to units, different from unit to unit, to achieve usage control process different from unit to unit. More specifically, the content is divided into content management units (CPS units), and the units are individually decrypted for individual usage control.

During the use of the content, it is necessary to acquire the CPS unit key (title key) assigned to each unit Data processing is performed to play back the content in accordance with a decrypt process sequence that is predetermined with other necessary keys and key generation information applied. The setting mode of the content management unit (CPS unit) is described below with reference to FIG. 2.

As shown in FIG. 2, the content is arranged in a layer structure composed of (A) index 210, (B) movie object 220, (C) play list 230, and (D) clip 240. When an index, such as a title to be accessed by a playback application program, is specified, a playback program associated with the title is specified. In response to program information of the specified playback program, a play list defining the playback order of contents is selected.

A play item is contained in the play list as playback data information. In accordance with clip information as a playback period defined by the play item contained in the play list, an AV stream as content data and commands are selectively read. The AV stream is thus played back, and the commands are executed. A large number of play lists and play items are present, and tagged with play list IDs and play item IDs, respectively.

FIG. 2 illustrates two CPS units. These CPS units constitute a portion of the content stored in the information recording medium 100. Each of CPS unit 1, 271 and CPS unit 2, 272 is composed of a title as the index, a movie object as a playback program file, a play list, and a clip containing the AV stream file as the content data.

The content management unit (CPS unit) 1, 271 includes title 1, 211 and title 2, 212, playback programs 221 and 222, play lists 231 and 232, and clips 241 and 242. AV stream data files 261 and 262 as content real data contained in the two clips 241 and 242, respectively, are at least encrypted data. The data is the one encrypted using a title key (Kt1) as an encryption key set in response to the content management unit (CPS unit) 1, 271 (also referred to as a CPS unit key).

The content management unit (CPS unit) 2, 272 includes an application 1, 213 as the index, an application program 224, a play list 233, and a clip 243. An AV stream data file 263 as real data of the content contained in the clip 243 is encrypted using title key (Kt2) as an encryption key set in response to the content management unit (CPS unit) 2, 272.

To perform one of an application file and a content playback process responsive to the content management unit 1, 271, a user needs to perform the decryption process by acquiring the title key:Kt1 as an encryption key set in response to the content management unit (CPS unit) 1, 271. To perform one of an application file and a content playback process responsive to the content management unit 2, 272, a user needs to perform the decryption process by acquiring the title key:Kt2 as an encryption key set in response to the content management unit (CPS unit) 2, 272.

FIG. 3 illustrates the setting structure of the CPS unit and the title key corresponding thereto. As shown in FIG. 3, a CPS setting unit as a usage management unit of the encrypted content to be stored in the information recording medium 100 corresponds to a title key (CPS unit key) applied to the corresponding CPS unit. A CPS unit and a title key for future data can be stored. For example, a data area 281 is an entry for future data.

The CPU setting unit can be various factors, such as a title of the content, an application, and a data group. The CPS unit management table lists a CPS unit ID as an identifier for a corresponding CPS unit.

As shown in FIG. 3, a title 1 is a CPS unit 1, a title key Kt1 is generated to decrypt the encrypted content belonging to the CPS unit 1. The decryption process is thus performed based on the generated title key Kt1.

To perform control process different from unit to unit, the content stored in the information recording medium 100 is encrypted and stored with keys, different from unit to unit, being assigned to the units. To perform individual use management to the content management unit (CPS unit), use permission information (usage rule) is set to each CPS unit. As previously discussed, the use permission information contains the copy and playback control information (CCI), such as copy control information and playback control information of the encrypted content contained in each content management unit (CPS unit).

To generate the title key, data processing needs to be performed with a variety of information stored in the information recording medium 100 applied. Specific processes will be described in detail later.

The structure of a directory corresponding to a content having a layered structure of FIG. 2 is described below with reference to FIG. 4.

(A) The index 210 of FIG. 2 corresponds to an index.bdmv file in the directory of FIG. 3.

(B) The movie object 220 of FIG. 2 corresponds to a MovieObject.bdmv file of FIG. 3.

(C) The play list 230 of FIG. 2 corresponds to files under a PLAYLIST directory of the directories of FIG. 3.

(D) The clip 240 of FIG. 2 corresponds to files under a CLIPINF directory, and files under a STREAM directory, the files of FIG. 3, the files having the same file number.

As previously discussed, the content stored in the information recording medium is set as the broken data where a portion of member data of the content is replaced with data different from correct content data. The decryption process alone cannot play back the correct content. To play back the correct content, data registered in the fix-up table needs to be substituted for the broken data. In the substitution process, the data transform program 106 stored in the information recording medium 100 is used to covert data based on the registered data of the fix-up table 105.

As previously discussed, the fix-up table 105 and the data transform program 106 are stored in the information recording medium 100. FIG. 5 illustrates the fix-up table corresponding to the content having the directory structure of FIG. 4 and the directory structure of the data transform program 106. As shown in FIG. 5, the data transform program 106 is produced for the AV content having the directory structure of FIG. 4.

[ContentCode.svm] of FIG. 5 corresponds to the data transform program 106.

[FixUpXXXXX.tbl] of FIG. 5 corresponds to a fix-up table defined for one clip. (XXXXX of FixUpXXXXX.tbl OF FIG. 5 matches a file number of a corresponding clip information file.)

[3. Content Playback Process]

The mutual authentication is performed between the drive 120 and the host application 150. The content stored in the information recording medium 100 loaded in the drive 120 is transferred to the host application 150 for content playback processes on the premise that the mutual authentication has been successfully completed. A plurality of playback processes are described below.

(3.1 Content Playback Process 1) Content playback process 1 is described below with reference to FIG. 6. FIG. 6 illustrates, from left to right, a information recording medium 310 storing an encrypted content, a drive 330 having the information recording medium 310 loaded therein to read data from the information recording medium 310, and a host application 350 performing the playback process by acquiring, via the drive 330, the content stored in the information recording medium 310 connected to the drive 330 for data communication. The host application 350 is executed by the information processing apparatus such as a personal computer.

The information recording medium 310 stores an MKB (Media Key Block) 311, a title key file 312, an encrypted content 313, a fix-up table 314, and a data transform program 315. The host application 350 holds a device key 351 applied to the process of the MKB.

The sequence of the playback process is described with reference to FIG. 6. In the sequence of the playback process, the host application 350 acquires a storage content from the information recording medium 310 via the drive 330.

Before the information recording medium 310 reads the storage content, the host application 350 and the drive 330 performs the mutual authentication process in step S101. In the mutual authentication process, the host application 350 determines whether the drive 330 is an authorized drive, and the drive 330 determines whether the host application 350 is an authorized application. The mutual authentication process can be any of a variety of processes. FIG. 7 illustrates one mutual authentication process example.

The mutual authentication process of FIG. 7 complies with a public key encryption system. In step S121, the drive 330 transmits, to the host application 350, a drive public key certificate stored in own memory (NVRAM) and an arbitrarily generated random number. In step S122, the host application 350 transmits, to the drive 330, a host public key certificate stored in own memory (NVRAM) and an arbitrarily generated random number.

In step S123, the drive 330 examines the authenticity of the host public key certificate received from the host application 350, and the revoke status of the host application 350 based on a host certificate revocation list (host CRL). In step S123, the drive 330 first verifies a signature set in the host CRL. ECDSA V of FIG. 7 means the execution of the signature verification based on an elliptic curve cryptosystem. Signature verification is performed using a public key corresponding to a secret key of a key control entity. The drive holds the public key of the key control entity of the signature verification in the memory (NVRAM), and performs the signature verification using the public key. Through the signature verification, the drive verifies that the host public key certificate is not falsified. If the drive determines in the signature verification determines that the host public key certificate is falsified, processing quits.

After determining that the host public key certificate is not falsified, the drive 330 references the host CRL to determine that the certificate is not revoked. The host CRL is a list of certificates revoked in accordance with the public key certificate issued to the host application 350. The host CRL is acquired from one of the memory in the drive and an information recording medium.

The drive 330 acquires the ID of the host public key certificate determined to be free from falsification, and determines whether the ID matches an ID registered in the host CRL. If an ID matching the ID of the host public key certificate is present in the host CRL, the drive 330 determines that the host application 350 is a revoked application. Processing quits. If the ID of the host public key certificate is not the one registered in the host CRL, the drive 330 determines that the host application 350 is not a revoked application, and continues processing.

In step S124, the host application 350 verifies, based on the drive public key certificate received from the drive 330, the authenticity of the drive public key certificate (falsification-free state), and determines, based on the drive CRL, whether the drive 330 is revoked. Only if it is determined that the drive public key certificate is authentic, and that the drive 330 is not revoked, processing continues. The drive CRL is acquired from one of the memory in the host application and the information recording medium.

The drive 330 and the host application 350 transmit authentication results as a drive response (in step S125) and a host response (in step S126), respectively. To notify of the authentication results, the drive 330 and the host application 350 generate ECDH (elliptic curve Diffie-Hellman) values as elliptic curve cryptosystem values, and notify each other of the generated values.

Upon receiving the drive authentication results and the ECDH value from the host application 350, the drive 330 examines the host response in step S127 to verify that the drive authentication has been successfully completed. The drive 330 generates a session key as a common key by applying the received ECDH value. Upon receiving the host authentication results and the ECDH value from the drive 330, the host application 350 examines the drive response in step S128 to determine that the host authentication has been successfully completed. The host application 350 generates a session key as a common key based on the ECDH value.

In the mutual authentication process, the drive 330 and the host application 350 share the session key as the common key.

Returning to FIG. 6, the content usage process sequence is continuously discussed. In step S101, the mutual authentication between the drive 330 and the host application 350 is performed, and the session key (Ks) is shared. In step S102, the host application 350 acquires the MKB 311 from the information recording medium 310 via the drive 330, and performs the process of the MKB 311 with the device key 351 stored in the memory applied. The host application 350 acquires the media key (Km) from the MKB.

As previously discussed, the MKB (Media Key Block) 311 is generated in accordance with the tree-structured key distribution system known as a broadcast encryption method. Only through a process (decryption process) based on the device key (Kd) stored in the information processing apparatus of the user holding effective license, the MKB 311 enables the acquisition of the media key (Km) required to decrypt a content.

In step S103, a title key file read from the information recording medium 310 is decrypted using the media key (Km) acquired in the MKB process in step S102. The title key (Kt) is thus acquired. The title key file stored in the information recording medium 310 contains data that has been encrypted with the media key Km. The title key (Kt) applied to the content decryption is acquired in the process with the media key applied thereto. In the decryption process in step S103, an AES encryption algorithm is applied, for example.

The host application 350 reads the encrypted content 313 from the information recording medium 310 via the drive 330, and stores the read content in a track buffer 352. In step S104, the host application 350 performs the decryption process on the content stored in the track buffer 352 with the title key (Kt) applied, and acquires the decrypted content.

The decrypted content is stored in a plain TS buffer 353. The phrase (Plain TS) stands for plain transport stream. The decrypted content stored in the plain TS buffer 353 is a content containing the above-described broken data. The decrypted content as is cannot be played back, and thus needs to be subjected to a predetermined data transform process (data substitution by overwriting).

A block 371 of FIG. 6 represents the data transform process. The block 371 corresponds to the process of the data transform processor 154 of the host application 150 of FIG. 1. The data transform process is summarized below with reference to FIG. 8.

The encrypted content 313 of FIG. 6 is an encrypted content stored in the information recording medium 310. The encrypted content is temporarily stored in the track buffer 352 of the host application 350. The encrypted content corresponds to track buffer storage data 401 of FIG. 8(1).

Through the decryption process in the host application 350, the encrypted content as the track buffer storage data 401 is decrypted. The decrypted data is then stored in the plain TS buffer 353. The decrypted data corresponds to decrypted data 402 of FIG. 8(2).

The decrypted data 402 contains broken data 403 different from the correct content member data. In the data transform process of the host application 350, transform data 404 as the correct member data acquired from the fix-up table 314 recorded in the information recording medium 310 of FIG. 6 is substituted for the broken data 403. The substitution process is performed as an overwrite process on a portion of data written in the plain TS buffer 353.

In the data transform process performed by the host application 350, not only the transform data as the correct content data is substituted for the broken data but also transform data 405 containing an identification mark is substituted for a portion of member data of the decrypted data 402 as shown in FIG. 8.

With the identification mark, a member bit of the identification information identifying one a content playback apparatus and a content playback application can be analyzed. More specifically, the identification mark is member data of the identification information (such as a player ID) of an information processing apparatus as a player performing the host application 350 or an identification mark generated based on the player ID. The transform data containing the identification mark is data that is slightly modified from the bit value of correct content data within a range that does not affect the playback of the content.

Many units of transform data 405 containing identification marks are arranged in the content. For example, the player ID is determined by collecting and analyzing the transform data 405 having a plurality of identification marks. The transform data 405 having the identification marks is data that has a member bit modified from the correct content data within a range that permits the content to be played back normally. The transform data 405 is data that permits bit determination (of a identification mark member bit) using the MPEG bit stream analysis.

The fix-up table stored in the information recording medium 310 contains a large number of units of registered transform data 405 of FIG. 8, registered transform data 405 containing identification marks, and write position information thereof. The data stored in the plain TS buffer 353 becomes transform data 406 of FIG. 8(3) by performing the data transform process based on fix-up table storage information.

Returning to FIG. 6, the process of the broken-lined block 371, namely, the data transform process performed in the host application 350 is described below. The data transform process is performed by a secure VM 356 set as a virtual machine in the host application 350. The secure VM 356 is a virtual computer that directly interprets and executes an intermediate language. The secure virtual machine (VM) 356 interprets and executes command code information in the intermediate language not dependent on platform.

The secure VM 356 reads a data transform program 315 containing the command code information from the information recording medium 310. The secure VM 356, controlled by an event handler 354, receives player information 355 such as ID information of a player (information processing apparatus) executing the host application. The secure VM 356 thus performs the data transform program 315 acquired from the information recording medium 310. An emulator check of determining whether the secure VM 356 correctly performs the data transform process is performed. The host application and the process of the player (information processing apparatus) as a host application executing apparatus are monitored. If one of a process error and an unauthorized process is detected, the data transform process of the secure VM 356 is suspended.

Using the fix-up table read from the information recording medium 310, the secure VM 356 transforms the data stored in the plain TS buffer 353 as illustrated in the data transform process in step S105 of FIG. 6. The transform data 404 as the correct content member data is substituted for the broken data 403 in the decrypted data 402 of FIG. 8. The transform data 405 with the identification mark is substituted for a portion of the content. The storage data in the plain TS buffer 353 is thus updated with the transform data.

The transformed TS (transport stream) is output to the outside via a network and played back on an external playback apparatus. In a demultiplexing process in step S106, the transport stream (TS) is demultiplexed into an elementary stream (ES). The elementary stream is subjected to a decode process (step S107), and then output to a display and a loudspeaker for playback.

The data structure of the data fix-up table recorded in the information recording medium 310 is described with reference to FIG. 9. The data fix-up table recorded in the information recording medium 310 has the structure of FIG. 9, for example.

The data fix-up table includes:

Number of Fix-up Entry: number of fix-up entries (Number of Fix-up Entry)

Fix-up Entry Length: number of bytes in one transform data entry (Byte Length of one Fix-Up Entry ( )=(N+6))

SPN (source packet number): packet number from start position of a AV stream file of transform data written packet (Absolute Transformed Packet Number from the beginning of AV Stream File)

Byte Offset: byte offset indicating write start position of transform data in packet specified by SPN (Start byte position of transform data in the packet)

player-id-bit-position: bit position of identification mark (such as player ID) (indicating bit position of player ID for forensic mark)

Fix-Up Data: Overwriting transform data (value to be overwritten (N bytes are transformed in one TS packet)).

A large number of broken data units are dispersed within a single content, and the transform data recorded in the fix-up table overwrites the locations of the broken data. A number of locations are set up in the single content to write the transform data having identification marks such as the player ID therewithin. The fix-up table includes (a) the transform data, (b) the transform data containing the identification mark, as "actual overwriting data", and a table as information specifying the location of data writing.

The frequency of occurrence of data substitution of the transform data (including the one having the identification mark) per unit area and the size of the transform data can be varied. The size of the transform data depends on the frequency of occurrence of the data substitution. For example, two units of transform data or two units of transform data containing identification marks can be set on a per unit GOP (group of pictures) basis of MPEG contents. If the transform data (also the transform data containing the identification mark) is 8 bytes long, a fix-up table has a size of about 400

KB. If the transform data is 16 bytes long, the size of the fix-up table becomes about 600 KB.

For example, five units of transform data or five units of transform data containing identification marks can be set on a per unit GOP (group of pictures) basis of MPEG contents. If the transform data (also the transform data containing the identification mark) is 8 bytes long, a fix-up table has a size of about 1 MB. If the transform data is 16 bytes long, the size of the fix-up table becomes about 1.5 MB.

The secure VM 356 in the host application 350 writes (a) the transform data and (b) the transform data containing the identification mark at locations specified by the fix-up table 314 recorded in the information recording medium 310. In this process, the transform data or the transform data containing the identification mark overwrites the data stored in the plain TS buffer 353. As a result, the data in the plain TS buffer 353 is replaced with the data of FIG. 8(3).

The output process or the playback process of the content from the player (for example, an information processing apparatus such as a PC) having the host application installed thereon is thus performed based on the transform data of FIG. 8(3).

The transform data is correct content member data, and the transform data containing the identification mark is data applied to the playback process of the correct content data. A correct content is thus played back through the decode process based on these units of data. If the content is copied in an unauthorized manner, and the illegal copy data is widely distributed, the player ID can be acquired by analyzing the transform data containing the identification mark. The source of the illegal content data is thus identified.

(3.2) Content Playback Process 2

Content playback process 2 is described with reference to FIG. 10. FIG. 10 illustrates, from left to right, the information recording medium 310 storing an encrypted content, the drive 330 having the information recording medium 310 loaded therein to read data from the information recording medium 310, and the host application 350 performing the playback process by acquiring, via the drive 330, the content stored in the information recording medium 310 connected to the drive 330 for data communication. The host application 350 is executed by the information processing apparatus such as a PC.

The MKB (Medial Key Block) and the title key file recorded on the information recording medium 310 are not shown in FIG. 10. The host application 350 calculates the MKB (Medial Key Block) recorded on the information recording medium 310, and the title key (Kt) by applying the same process discussed with reference to FIG. 6 using the title key file. This process is not shown either in FIG. 10. Also stored in the information recording medium 310 are the encrypted content 313, the fix-up table 314, and the data transform program 315.

In the content playback process 2 of FIG. 10, the process of a block 381 enclosed in an broken lined box is performed on a real-time basis, and the process of a block 382 is performed as a batch process prior to one of a content playback operation and a content output operation. More specifically, prior to the content playback operation or the content output operation, the secure VM 356 reads the data transform program 315 containing command information from the information recording medium 310, and performs the decryption process on the fix-up table 314 read from the information recording medium 310, under the control of the event handler 354 in response to the inputting of the player information 355.

The fix-up table 314 recorded in the information recording medium 310 is obfuscated by the AES encryption and XOR gating process. In accordance with the data transform program 315, the secure VM 356 executes the decryption process and a predetermined calculation process, thereby outputting the fix-up table as plain data. The process up until now is performed as a batch process prior to one of the content playback operation and the content output operation.

Subsequent process is performed on a real-time basis in parallel with one of the content playback operation and the content output operation. More specifically, the content decryption process is performed in step S201. The data transform process is performed in step S202. In other words, (a) the transform data and (b) the transform data containing the identification mark, registered in the fix-up table 314 recorded on the information recording medium 310, are written in accordance with the locations specified in the fix-up table 314. The output process of outputting the transformed transport stream (TS) is performed. In step S203, the demultiplexing process of demultiplexing the TS into the elementary stream (ES) is performed. In step S204, the decode process is performed. These processes are performed on a real-time basis in parallel with one of the content playback operation and the content output operation.

Even if the secure VM 356 takes time to process the fix-up table 314, this process sequence is performed on a real-time basis without affecting one of the content playback operation and the content output operation.

(3.3) Content Playback Process 3

Content playback process 3 is described below with reference to FIG. 11. As FIG. 10, FIG. 11 illustrates, from left to right, the information recording medium 310 storing the encrypted content, the drive 330, and the host application 350. As shown in FIG. 11, as previously discussed with reference to FIG. 10, the MKB, the title key file, and the process with the MKB (Media Key Block) and the title key file applied thereto are identical to those in the content playback process 1 of FIG. 6, and are thus omitted herein.

In the content playback process 3 of FIG. 11, the process of the block 381 enclosed in a broken lined box is performed on a real-time basis, and the process of the block 383 is intermittently performed as a low-frequency process prior to or during one of the content playback operation and the content output operation. The secure VM 356 reads the data transform program 315 containing the command code information, and performs, intermittently prior to or during one of the content playback operation and the content output operation, the decryption process on the fix-up table 314 read from the information recording medium 310, under the control of the event handler 354 in response to the inputting of the player information 355.

The fix-up table 314 recorded in the information recording medium 310 is obfuscated by performing one of the AES encryption and XOR gating process on a per FUT (fix-up table) block basis of the fix-up table 314. In accordance with the data transform program 315, the secure VM 356 executes one of the decryption process and a predetermined calculation process on a per fix-up table (FUT) block basis, thereby outputting the fix-up table as plain data on a per block unit basis. The process up until now is intermittently performed prior to or during one of the content playback operation and the content output operation.

The data structure of the transform data obfuscated on a fix-up table (FUT) block basis is described below with reference to FIGS. 12 and 13. The data of the fix-up table recorded in the information recording medium 310 has a structure as shown in FIG. 12, for example. The data of the fix-up table includes Number of FUT blocks: number of fix-up table blocks, Length of FUT block: number of bytes in one fix-up table block, Number of Fix-Up Entry in FUT block: number of transform data entries in one fix-up table block, Length of one Fix-up Entry: number of bytes in one transform data entry, First SPN for FUT block: packet number as first entry data write position in fix-up table block, and FUT: partial FUT block obfuscated by performing individually one of an encryption process and a calculation process (FUT block).

The data structure of the fix-up table block (FUT block) as a partial fix-up table is listed in FIG. 13. The table block includes SPN (source packet number): packet number from start position of an AV stream file of transform data written packet (Absolute Transformed Packet Number from the beginning of AV Stream File, Byte Offset: byte offset indicating write start position of transform data in packet specified by SPN (Start byte position of transform data in the packet), FM_flag: flag defining whether to perform transform process on transform data with identification mark, for example, 0: transform process is performed at all players, 1: transform process is preformed if bit at position corresponding to player ID is 1, player_id_bit-position: indicating bit position of player ID for identification mark (such as player ID) (Indicate bit position of Player ID for forensic), and Fix-up Data: overwriting transform data (Value to be overwritten (N byte is transformed in one TS Packet)).

The table block (FUT block) of FIG. 13 is set as data that has been individually encrypted or calculated. The secure VM 356 of FIG. 11 reads the data transform program 315 containing the command code information from the information recording medium 310, and performs, intermittently prior to or during one of the content playback operation and the content output operation, one of the decryption process and the calculation process on a per table block (FUT block) basis on the fix-up table 314 read from the information recording medium 310, under the control of the event handler 354 in response to the inputting of the player information 355. The secure VM 356 thus acquires the partial FUT as plain data. This process is intermittently performed prior to or during one of the content playback operation and the content output operation.

Subsequent process is performed on a real-time basis in parallel with the one of the content playback operation and the content output operation. More specifically, the content decryption process is performed in step S201. The data transform process is performed in step 5202. In other words, (a) the transform data and (b) the transform data containing the identification mark, registered in the fix-up table 314 recorded on the information recording medium 310, are written in accordance with the locations specified in the fix-up table 314. The output process of outputting the transformed transport stream (TS) is performed. In step S203, the demulplexing process of demultiplexing the transport stream (TS) into the elementary stream (ES) is performed. In step S204, the decode process is performed. These processes are performed on a real-time basis in parallel with the one of the content playback operation and the content output operation.

Even if the secure VM 356 takes time to process the fix-up table 314, this process sequence is performed on a real-time basis without affecting the one of the content playback operation and the content output operation as previously discussed with reference to the content playback process 3 of FIG. 10. The secure VM 356 generates successively the transform data corresponding to portions of content partial data rather than generating at a time the transform data required for the content playback operation and the content output operation. If an illegal process is found in the content playback process, the secure VM 356 suspends the process thereof in response to illegal process detection information from the event handler 354. The generation of the transform data is quit, and the content playback operation and the content output operation of an illegal content are thus suspended in the middle thereof.

(3.4) Content Playback Process 4

Content playback process 4 is described with reference to FIG. 14. As FIGS. 10 and 11, FIG. 14 illustrates, from left to right, the information recording medium 310 storing an encrypted content, the drive 330, and the host application 350. The MKB (Media Key Block), the title key file, and the process with the MKB and the title key file applied thereto are identical to those in the content playback process 1 of FIG. 6, and are thus omitted herein The information recording medium 310 stores the encrypted content 313, the fix-up table 314, and the data transform program 315.

In the content playback process 4 of FIG. 14, the process of a block 381 enclosed in a broken lined box is performed on a real-time basis, and the process of a block 382 is performed as a batch process prior to one of the content playback operation and the content output operation as previously discussed with reference to FIG. 10. The secure VM 356 reads the data transform program 315 containing command information from the information recording medium 310, and performs the decryption process on the fix-up table 314 read from the information recording medium 310 in response to the inputting of the player information 355 under the control of the event handler 354.

The secure VM 356 performs the decryption process or a predetermined calculation process in accordance with the data transform program 315, thereby acquiring the fix-up table as plain data. The plain fix-up table obtained as a result is stored in a table storage unit 362.

The data transform process in step 5202 is performed under the control of the real-time event handler 361 in parallel with one of the content playback operation and the content output operation. Under the control of the real-time event handler 361, the transform data registered as the plain data in the table storage unit 362, including (a) the transform data and (b) the transform data containing the identification mark, is written at locations specified in the fix-up table.

The process sequence of the content playback process is identical the content playback process of FIG. 10. More specifically, the content decryption process is performed in step S201. In step S203, the demulplexing process is performed. In step S204, the decode process is performed. These processes are performed on a real-time basis in parallel with one of the content playback operation and the content output operation.

As with the playback process 2 discussed with reference to FIG. 10, even if the secure VM 356 takes time to process the fix-up table 314, this process sequence is performed on a real-time basis without affecting the one of the content playback operation and the content output operation.

(3.5) Content Playback Process 5

Content playback process 5 is described with reference to FIG. 15. FIG. 15 illustrates, from left to right, the information recording medium 310 storing an encrypted content, the drive 330, and the host application 350. The MKB (Media Key Block), the title key file, and the process with the MKB and the title key file applied thereto are identical to those in the content playback process 1 of FIG. 6, and are thus omitted herein.

In the content playback process 5 of FIG. 15, the process of the block 381 enclosed in a broken lined box is performed on a real-time basis, and the process of the block 382 enclosed in a broken lined box is intermittently performed as a low-frequency process prior to or during one of the content playback operation and the content output operation as previously discussed with reference to FIG. 11. The secure VM 356 reads the data transform program 315 containing the command information from the information recording medium 310, and intermittently and partly performs the decryption process on the fix-up table 314 read from the information recording medium 310 in response to the inputting of the player information 355 under the control of the event handler 354.

The fix-up table 314 is temporarily stored in a pre-load table storage unit 364 in the host application 350. The secure VM 356 acquires the table data stored in the pre-load table storage unit 364, and performs one of the decryption process and a predetermined calculation process in accordance with the data transform program 315, thereby generating the fix-up table as plain data partially and successively.

The secure VM 356 decrypts only a portion of member data of the fix-up table containing the transform data of a portion of the content, thereby generating intermittently a plain fix-up table as a portion of the data. The plain partial fix-up table thus obtained is stored in a partial table storage unit 363.

The data transform process in step S202 is performed under the control of the real-time event handler 361 in parallel with one of the content playback operation and the content output operation. Under the control of the real-time event handler 361, the transform data registered as the plain data in the partial table storage unit 363, including (a) the transform data and (b) the transform data containing the identification mark, is written at locations specified in the fix-up table. This data transform process is performed on a real-time basis in parallel with the one of the content playback operation and the content output operation.

The process sequence of the playback process is identical the process sequence of FIG. 11. More specifically, the content decryption process is performed in step S201. In step S203, the demulplexing process is performed. In step S204, the decode process is performed. These processes are performed on a real-time basis in parallel with one of the content playback operation and the content output operation.

As with the playback process 3 discussed with reference to FIG. 11, even if the secure VM 356 takes time to process the fix-up table 314, this process sequence is performed on a real-time basis without affecting the one of the content playback operation and the content output operation. The secure VM 356 generates successively the transform data corresponding to portions of content partial data rather than generating at a time the transform data required for the content playback operation and the content output operation. If an illegal process is found in the content playback process, the secure VM 356 suspends the process thereof in response to illegal process detection information from the event handler 354. The generation of the transform data is quit, and the content playback operation and the content output operation of an illegal content are thus suspended in the middle thereof.

(3.6) Content Playback Process 6

Content playback process 6 is described with reference to FIG. 16. FIG. 16 illustrates, from left to right, the information recording medium 310 storing an encrypted content, the drive 330, and the host application 350. The MKB (Media Key Block), the title key file, and the process with the MKB and the title key file applied thereto are identical to those in the content playback process 1 of FIG. 6, and are thus omitted herein. As shown in FIG. 16, the information recording medium 310 stores an encrypted content 318 containing a fix-up table, and a data transform program 315. The process of the block 381 enclosed a broken lined box is performed on a real-time basis, and the process of the block 383 enclosed in a broken lined box is performed intermittently.

The fix-up table is divided among particular packets of member data of the encrypted content. As shown in FIG. 17, for example, the fix-up table is contained in the transport stream packet containing the content. The structure of the content data is shown in FIG. 17(*a*). As shown, the content data is composed of transport stream (TS) packets. The transport stream contains TS packets, each containing a predetermined number of bytes. The fix-up table is divided and then recorded in a plurality of packets out of these TS packets. As shown, the fix-up table is recorded in TS packets 391, 392, . . . . The TS packet storing the fix-up table may contain program map table (PMT) dispersed and set in the content.

Data of divided fix-up table has the same structure as the fix-up table block (FUT block) described with reference to FIG. 13. Recorded in the fix-up table are the transform data (or the transform data containing the identification mark) to be substituted for the decrypted content and recording position of the transform data.

As shown in FIG. 17(*b*), the recording position of the transform data recorded in the fix-up table is set to be in the vicinity of the TS packet containing the fix-up table. For example, packets 394 and 395, each having the recording area of the transform data, are set to be in the vicinity of the packet 391 containing the fix-up table. With this arrangement, the data substitution process with the transform data is performed continuously in succession to the decryption process when the decryption and the playback of the content are performed on a real-time basis. The transform data is acquired by detecting and analyzing the TS packet containing the fix-up table, and the overwrite process of overwriting the transform data onto the location having the fix-up table recorded thereon is efficiently performed.

In the content playback process 6 of FIG. 16, the process of the block 381 enclosed in a broken lined box is performed on a real-time basis, and the process of the block 383 is performed intermittently at a low-frequency rate prior to or during one of the content playback operation and the content output operation.

The secure VM 356 reads the data transform program 315 containing the command code information from the information recording medium 310. The secure VM 356 generates intermittently parameters (P1, P2, P3, . . . ) required to transform the fix-up table, recorded together with the content on the information recording medium 310, into plain fix-up table and outputs the resulting plain fix-up table. The secure VM 356 performs intermittently this process in response to the inputting of the player information 355, under the control of the event handler 354, prior to or during one of the content playback operation and the content output operation.

The parameters P1, P2, P3, . . . are calculation processing parameters or encryption processing parameters respectively applied to the fix-up tables 1, 2, 3, . . . divided by a predetermined content data unit, dispersed and recorded in the content. The fix-up tables 1, 2, 3, . . . are subjected to the calculation process or the encryption process, each with a different one of the parameters P1, P2, P3, . . . applied thereto, and then recorded onto the information recording medium.

More specifically, the parameters P1, P2, P3, . . . are exclusive OR gating parameters respectively applied to the divided fix-up tables 1, 2, 3, . . . . In accordance with the data transform program 315, the secure VM 356 intermittently generates and outputs the parameters (P1, P2, P3, . . . ) required to transform the fix-up table 314 into the plain fix-up table.

In the real-time processing block 381, the encrypted content 318 containing the fix-up table is decrypted in step S301. The fix-up table is then demultiplexed in the demultiplexing process in step S302. In step S303, the table restoration and data transform process is performed under the control of the real-time event handler 361. Under the control of the real-time event handler 361, the fix-up table is decrypted or calculated with the parameters (P1, P2, P3, . . . ) intermittently output from the secure VM 356 applied, and the plain fix-up table results. The transform data registered in the acquired partial fix-up table, namely, (a) the transform data and (b) the transform data containing the identification mark, is written at locations specified in the fix-up table on a real-time basis in parallel with one of the content playback operation and the content output operation.

If the parameters P1, P2, P3, . . . are XOR gating parameters of the transform data on a per content partial data unit, the table restoration process in step S303 is performed as follows:
[fix-up table 1] (XOR) [P1],
[fix-up table 2] (XOR) [P2],
[fix-up table 3] (XOR) [P3],
By performing the exclusive OR gating process, the plain fix-up table is obtained. The above formula [A] (XOR) [B] represents an exclusive OR gating process of A and B.

The fix-up table contained in the encrypted content 318 recorded on the information recording medium 310 is split into transform data corresponding to portions of the content, and the fix-up table having transform data position information. The fix-up tables with the unique parameters P1, P2, P3, . . . XOR gated therewith are stored. These parameters are successively retrieved and output by the secure VM 356.

The process subsequent to the table restoration and data transform process in step S303 is identical to the process discussed with reference to FIG. 11. The subsequent process is performed on a real-time basis in parallel with one of the content playback operation and the content output operation. More specifically, the demultiplexing process in step S304 and the decode process in step S305 are performed on a real-time basis in parallel with one of the content playback operation and the content output operation.

In the content playback process 6, the member data of the fix-up table corresponding to the entire content is divided, and the divided fix-up tables are associated with the different parameters. The secure VM 356 intermittently outputs the parameters. Even if a parameter is leaked, the restoration of the entire content is difficult. The content is thus securely used and managed. As in the process discussed with reference to FIG. 10, this process sequence is performed on a real-time basis without affecting the process of content playback and outputting. If an illegal process is found in the content playback process, the secure VM 356 suspends the process thereof in response to illegal process detection information from the event handler 354. The generation of the transform data is quit, and the playback process and the output process of an illegal content are thus suspended in the middle thereof.

(3.7) Content Playback Process 7

Content playback process 7 is described with reference to FIG. 18. FIG. 18 illustrates, from left to right, the information recording medium 310 storing an encrypted content, the drive 330, and the host application 350. The MKB (Media Key Block), the title key file, and the process with the MKB and the title key file applied thereto are identical to those in the content playback process 1 of FIG. 6, and are thus omitted herein. As shown in FIG. 18, the information recording medium 310 stores an encrypted content 318 containing a fix-up table, and a data transform program 315 as in the content playback process 6 previously discussed with reference to FIG. 16. The process of the block 381 enclosed a broken lined box is performed on a real-time basis, and the process of the block 383 enclosed in a broken lined box is performed intermittently.

As in the content playback process 6 discussed with reference to FIG. 16, the fix-up table is divided among particular packets of member data of the encrypted content. As shown in the arrangement of FIG. 17, for example, the fix-up table is contained in the transport stream packet containing the content. The structure of the divided fix-up table is described below with reference to FIG. 19.

FIG. 19 lists the data structure of the divided fix-up table. The divided fix-up table contains data body of transform data (including the transform data containing the identification mark) corresponding to a particular portion of the fix-up table and recording position information of the transform data. The data of the fix-up table of FIG. 19 includes SP_No: identifier (ID) of secret parameter (SP) [applied to XOR gating process]

type_indicator: type identifier [00: no transform process, 01b: transform process performed, 10b and 11b: transform process performed with transform data containing forensic mark], FM_ID_bit-position: identification bit position of player ID corresponding to transform data with identification mark, relative_SPN: packet position of transform data (number of packets from programmable map table (PMT) storing packet), byte_position: transform data recording position in packet, overwrite_value: transform data (including transform data with identification mark), relative_SPN_2: second packet position of transform data (number of packets from PMT packet), byte_position_2: recording position of second transform data in packet (applied to second transform data), and overwrite_value_2: second transform data (including transform data with identification mark).

As in the previously discussed content playback process 6, the fix-up table of FIG. 19 is divided among particular packets of member data of the encrypted content as shown in FIG. 20(a). As shown in FIG. 20(a), for example, the fix-up table is contained in the transport stream packet containing the content. The structure of the content data is shown in FIG. 20(a). As shown, the content data is composed of TS packets. The transport stream (TS) contains transport stream (TS) packets, each containing a predetermined number of bytes. The fix-up table is divided and then recorded in a plurality of packets out of these TS packets. As shown, the fix-up table is recorded in TS packets 501, 502, . . . . The TS packet storing the fix-up table may contain program map table (PMT) dispersed and set in the content As previously discussed with reference to FIG. 19, the data of the divided fix-up table includes the transform data (or the transform data containing the identification mark) to be substituted for in the decrypted content and the recording position of the transform data.

The fix-up table of FIG. 19 is set up as the transform data to be substituted for portions of the content data, and the fix-up table having the setting position information of the transform data with respect to the content. With the fix-up table, a data transform program containing a substitution process command of the content member data is executed. The data transform is thus performed.

The information [type_indicator] contained in the fix-up table is a type identifier identifying whether registration information is registration information (a) or registration information (b), wherein the registration information (a) is related to the transform data for transforming broken data into authorized content data and the registration information (b) is related to the transform data containing an identification mark for embedding identification information of one of a content playback apparatus and a content playback application program.

If the registration information area of the fix-up table is a registration information area related to the transform data containing the identification mark for embedding the identification information of one of the content playback apparatus and the content playback application program, the transform data selectively applied based on the identification information of one of the content playback apparatus and the content playback application program, namely, the transform data containing the identification mark is registered as the table registration information.

The registration information of the fix-up table [FM_ID_bit_position] is position information of a bit, to be referenced to determine a process mode, from among a plurality of bits of the identification information identifying one of the content playback apparatus and the content playback application program.

If the value of the bit to be referenced to determine the process mode is 1, the transform data containing the identification mark is substituted for the content member data. If the bit value of the bit to be referenced is 0, the substitution process is not performed. The process mode is determined in this way, and the data transform process is performed.

Alternatively, the transform process may be performed if the reference bit is 0, and the transform process may not be performed if the reference bit is 1. Alternatively, the transform data may be set to be different depending on whether the reference bit is 0 or 1. Depending on the bit value of the reference bit, the transform data may be selectively set.

The fix-up table is obfuscated by one of the calculation process and the encryption process. In the one of the calculation process and the encryption process, different parameters are applied to data of partial fix-up tables having transform data corresponding to portions of the member data of the content.

As shown in FIG. 20(b), the recording position of the transform data recorded in the fix-up table is set to be in the vicinity of the TS packet containing the fix-up table. For example, packets 511 and 512, each having the recording area of the transform data, are set to be in the vicinity of the packet 501 containing the fix-up table. Each packet is arranged by unit of GOP.

With this arrangement, the data substitution process with the transform data is performed continuously in succession to the decryption process when the decryption and the playback of the content are performed on a real-time basis. The transform data is acquired by detecting and analyzing the TS packet containing the fix-up table, and the overwrite process of overwriting the transform data onto the location having the fix-up table recorded thereon is efficiently performed.

The fix-up table is subjected to one of the calculation process and the encryption process with secret parameters (SP1, SP2, SP3, . . . ) applied thereto, and then stored in the information recording medium.

More specifically, each fix-up table is exclusive ORed (XORed) with different secret parameters (SP1, SP2, SP3, . . . ) applied, and then stored in each packet. Each secret parameter is composed of 128 bit data. The secure VM 356 of FIG. 18 reads the encrypted content 318 containing the command code information from the information recording medium 310. The secure VM 356 generates and outputs the secret parameters (SP1, SP2, SP3, . . . ), namely, exclusive OR (XOR) gating parameters (SP1, SP2, SP3, . . . ) required to transform the fix-up table recorded together with the content on the information recording medium 310 into the plain fix-up table. Under the control of the event handler 354, the secure VM 356 intermittently performs this process in response to the inputting of the player information 355 prior to or during one of the content playback operation and the content output operation. The output secret parameters (SP1, SP2, SP3, . . . ) are stored in a SP register 371. This process is intermittently and successively performed.

In accordance with the data transform program 315, the secure VM 356 of FIG. 18 generates, in addition to the secret parameters (SP1, SP2, SP3, . . . ), a specifying number (SPNo.) of each secret parameter, and an ID (FM_ID) of the identification mark set in response to the data transform program 315, and then outputs these values. These values are also stored in the SP register 371.

In the real-time processing block 381, the encrypted content 318 containing the fix-up table is decrypted in step S401. The fix-up table is then demultiplexed in the demultiplexing process in step S402. Under the control of the real-time event handler 361, the table restoration is performed and the data transform process are performed in step S403 and step S404. The table restoration and the data transform process in step S403 and step S404 are performed while the real-time event handler 361 monitors an event that can happen during one of the content playback operation and the content output operation. If an illegal process is detected, the process is quit.

In step S403, an exclusive OR gating operation is performed to the secret parameter (SPn) intermittently output from the secure VM 356 and stored in the SP register 371 and the fix-up table demultiplexed from the content by a demultiplexer. The fix-up table thus results.

In step S404, the specifying number (SPNo.) of the secret parameter, intermittently output together with the secret parameter (SPn) from the secure VM 356 and stored in the SP register 371, and the ID (FM_ID) of the identification mark are acquired. These values are referenced, and the process mode with the fix-up table applied is determined. The transform data recorded in the fix-up table, namely, (a) the transform data and (b) the transform data containing the identification mark, is written at locations specified in the fix-up table on a real-time basis in parallel with one of the content playback operation and the content output operation.

If the secret parameters SP1, SP2, SP3, . . . are XOR gating parameters with divided fix-up tables containing transform data corresponding to predetermined partial data units, the table restoration process in step S403 is performed as below.

[fix-up table 1] (XOR) [SP1],
[fix-up table 2] (XOR) [SP2],
[fix-up table 3] (XOR) [SP3], By performing the exclusive OR gating process, the plain fix-up table is obtained. The above formula [A] (XOR) [B] represents an exclusive OR gating process of A and B.

Referring to FIG. 21, the writing operation of the transform data is described below. The secret parameters SP1, SP2, SP3, . . . are switched every about 10 seconds in the normal playback time of the content. More specifically, a single fixed secret parameter is set as a parameter applied to a playback content for about 10 seconds. In each of content playback periods 0-T, T-2T, 2T-3T, . . . shown in FIG. 21, the same secret parameter is applied.

In accordance with the present embodiment, the period throughout which the same secret parameter is applied is about 10 seconds in the normal playback mode. Even if one secret parameter is leaked, a content of about 10 seconds can be played back. A secure content leak prevention mechanism is thus embodied.

Processes subsequent to the table restoration and the data transform process in step S403 and step S404 are identical to those described with reference to FIG. 16. The subsequent processes are performed on a real-time basis in parallel with one of the content playback operation and the content output operation. More specifically, the demultiplexing process is performed in step S405, and the decode process is performed in step S406. These processes are performed on a real-time basis in parallel with one of the content playback operation and the content output operation.

In the process of FIG. 18, the real-time event handler 361 is set up to perform the table restoration and the data transform process in step S403 and step S404. The table restoration and the data transform process are controlled while the real-time event handler 361 monitors an event that can happen during one of the content playback operation and the content output operation. Alternatively, the data transform process is performed on a real-time basis without monitoring the event. In such an arrangement, the real-time event handler 361 of FIG. 18 is omitted as shown in FIG. 22.

In accordance with the playback process 7, the member data of the fix-up table corresponding to the entire content is divided, the divided fix-up tables are associated with different secret parameters (SPn), the XOR gating operation is performed on the divided fix-up table with the different secret parameters applied thereto, and the results are stored in the information recording medium. The secure VM 356 intermittently outputs the secret parameters. Even if a part of the secret parameters is leaked, the entire transform data stored in the fix-up table cannot be acquired. As a result, the entire content cannot be restored, and a more secure content usage and management mechanism is established.

As in the process discussed with reference to FIG. 10, this process sequence is performed on a real-time basis without affecting the process of content playback and outputting. If an illegal process is found in the content playback process, the secure VM 356 suspends the process thereof in response to illegal process detection information from the event handler 354. The generation of the transform data is quit, and the content playback operation and the content output operation of an illegal content are thus suspended in the middle thereof.

(3.8) Content Playback Process 8

Content playback process 8 is described with reference to FIG. 23. FIG. 23 illustrates, from left to right, the information recording medium 310 storing an encrypted content, the drive 330, and the host application 350. The MKB (Media Key Block), the title key file, and the process with the MKB and the title key file applied thereto are identical to those in the content playback process 1 of FIG. 6, and are thus omitted herein. The information recording medium 310 includes the encrypted content 313, the fix-up table 314, and the data transform program 315.

As in the content playback process 7, the fix-up table is restored to a plain table on a portion by portion basis with the secret parameter (SP) applied in the content playback process 8 of FIG. 23. However, in the content playback process 7, the XOR gating operation is performed on the plurality of divided fix-up tables with different secret parameters (SP1, SP2, SP3, . . . ) applied thereto, and then held in the packets. In the content playback process 8, the encrypted-content 313 and the fix-up table 314 are stored in separate files onto the information recording medium 310.

In the content playback process 8, the process of the block 381 enclosed a broken lined box is performed on a real-time basis, and the process of the block 383 enclosed in a broken lined box is performed intermittently. The secure VM 356 intermittently outputs the secret parameters (SP) in time for one of the content playback operation and the content output operation. In the content playback process 8, the secure VM 356 acquires the fix-up table from the information recording medium 310 and stores the fix-up table in an XORed table storage unit 372. The storage process of the secure VM 356 to store the fix-up table onto the XORed table storage unit 372 can be performed as a step-by-step process to store, onto the XORed table storage unit 372, partial data of the fix-up table corresponding to the output secret parameter (SP) or a batch process to store the fix-up table onto the XORed table storage unit 372 prior to one of the content playback operation and the content output operation.

The fix-up table is set as one independent piece of data. A plurality of fix-up table (FUT) blocks is contained in a fix-up table file. Before being stored, the plurality of fix-up table (FUT) blocks are subjected to the XOR gating operation with different secret parameters (SP1, SP2, SP3, . . . ) respectively applied thereto.

The data structures of the fix-up table are described below with reference to FIGS. 24 through 26.

FIG. 24 illustrates the data structure of the entire fix-up table.

FIG. 25 illustrates the data structure of one of a plurality of fix-up table (FUT) blocks contained the fix-up table.

FIG. 26 illustrates the data structure of a transform data entry in the fix-up table (FUT) block.

As shown in FIG. 24, the fix-up table includes:

Number of FUT blocks: number of fix-up table blocks,

Length of FUT block: byte length of fix-up table block,

SP_No: secret parameter (SP) number (associated with SP generated by VM),

First SPN for FUT block: position of packet assigned to fix-up table block, and

FUT block ( ): fix-up table block (each block is processed (obfuscated) with different parameter).

The fix-up table contains a plurality of fix-up tables (FUT) blocks. The plurality of fix-up table (FUT) blocks are exclusive OR (XOR) gate processed with different secret parameters (SP1, SP2, SP3, . . . ) and then stored.

FIG. 25 illustrates the data structure of one of the plurality of fix-up table (FUT) blocks contained in the fix-up table of FIG. 24. As shown in FIG. 25, the fix-up table (FUT) block includes Number of FixUpEntry in this block: number of transform data units (including transform data units with identification marks), Base SPN for FixUpEntry: base packet position serving as a indicator of recording position of transform data (packet No.), and FixUpEntry ( ): transform data entry (obfuscated with secret parameter)).

FIG. 26 illustrates the data structure of the transform data entry (FixUpEntry) contained in the fix-up table block of FIG. 25. As shown in FIG. 26, the transform data entry (FixUpEntry) includes type_indicator: type identifier [00: no transform process; 01b: transform process performed; 10b and 11b: transform process performed with transform data with identification mark], FM_ID_bit_position: identification bit position of player ID corresponding to transform data with identification mark, relative_SPN: packet position of transform data (number of packets from programmable map table (PMT)), byte_position: transform data recording position in packet, overwrite value: transform data (including transform data with identification mark);

relative_SPN_2: second packet position of transform data (number of packets from PMT packet);

byte_position_2: recording position of second transform data in packet (second transform data), and overwrite_value_2: second transform data (including transform data with identification mark).

The fix-up table is set up as the transform data to be substituted for portions of the content data, and the fix-up table having the setting position information of the transform data with respect to the content. With the fix-up table, a data transform program containing a substitution process command of the content member data is executed. The data transform is thus performed.

The information [type_indicator] of FIG. 26 contained in the transform data entry [FixUpEntry] contained in the fix-up table block is a type identifier identifying whether registration information is registration information (a) or registration information (b), wherein the registration information is related to the transform data for transforming broken data into authorized content data and the registration information (b) is related to the transform data containing an identification mark for embedding identification information identifying one of a content playback apparatus and a content playback application program.

If the registration information area of the fix-up table is a registration information area related to the transform data containing the identification mark for embedding the identification information of one of the content playback apparatus and the content playback application program, the transform data selectively applied based on the identification information of one of the content playback apparatus and the content playback application program, namely, the transform data containing the identification mark is registered as the table registration information.

The registration information [FM_ID_bit_position] is position information of a bit, to be referenced to determine a process mode, from among a plurality of bits of the identification information identifying one of the content playback apparatus and the content playback application program. If the value of the bit to be referenced is 1, the transform data containing the identification mark is substituted for the content member data. If the bit value of the bit to be referenced is 0, the substitution process is not performed. The process mode is determined in this way, and the data transform process is performed.

Conversely, the transform process may be performed if the reference bit is 0, and the transform process may not be performed if the reference bit is 1. Alternatively, the transform data may be set to be different depending on whether the reference bit is 0 or 1. Depending on the bit value of the reference bit, the transform data is selectively set.

In the content playback process 8, the fix-up table includes the plurality of fix-up table blocks. Before being stored, the plurality of fix-up table (FUT) blocks are respectively exclusively ORed (XOR) with the different secret parameters (SP1, SP2, SP3, . . . ). The fix-up table is stored as the independent file data onto the information recording medium 310. As previously discussed with reference to FIGS. 24 through 26, the fix-up table includes the plurality of fix-up table (FUT) blocks, and the plurality of fix-up table (FUT) blocks are respectively exclusively ORed (XOR) with the different secret parameters (SP1, SP2, SP3, . . . ), and then the resulting values are stored in the information recording medium. The secret parameter is composed of 128 bit data, for example.

The secure VM 356 of FIG. 23 reads the encrypted content 318 containing the command code information from the information recording medium 310. The secure VM 356 generates and outputs the XOR secret parameters (SP1, SP2, SP3, . . . ) required to transform the fix-up table (FUT) block contained in the fix-up table 314 recorded on the information recording medium 310 into the plain fix-up table. Under the control of the event handler 354, the secure VM 356 intermittently performs this process in response to the inputting of the player information 355 prior to or during one of the content playback operation and the content output operation. The output secret parameters (SP1, SP2, SP3, . . . ) are stored in the SP register 371. This process is intermittently performed.

As the divided the fix-up table (FUT) discussed with reference to the content playback process 7, the fix-up table (FUT) block includes transform data corresponding to a portion of the content, and write position information of the transform data. As previously discussed with reference to FIG. 21, the fix-up table (FUT) block contains the transform data corresponding to a portion of the content of about 10 seconds.

In accordance with the data transform program 315, the secure VM 356 of FIG. 23 generates, in addition to the secret parameters (SP1, SP2, SP3, . . . ), a specifying number (SPNo.) of each secret parameter, and an ID (FM_ID) of the identification mark set in response to the data transform program 315, and then outputs these values. These values are also stored in the SP register 371.

In the real-time processing block 381, the encrypted content 318 is decrypted in step S451. One of the fix-up table (FUT) blocks stored in the XORed table storage unit 372 is acquired in step S452. The secret parameters (SPn) stored in the SP register 371 are subjected to the exclusive OR (XOR) gating operation and a fix-up table (FUT) block as plain data is thus obtained.

In step S453, the specifying number (SPNo.) of the secret parameter, intermittently output together with the secret parameter (SPn) from the secure VM 356 and stored in the SP register 371, and the ID (FM_ID) of the identification mark are acquired. These values are referenced, and the process mode with the fix-up table applied is determined. The transform data recorded in the fix-up table, namely, (a) the transform data and (b) the transform data containing the identification mark, is written at locations specified in the fix-up table. Under the control of the real-time event handler 361, this process is performed on a real-time basis in parallel with one of the content playback operation and the content output operation. The real-time event handler 361 controls the process while monitoring an event that may happen during one of the content playback operation and the content output operation. If an illegal process is detected, the process is quit in the middle thereof.

A specific usage process of the fix-up table is described. A type identifier [type_indicator] in the fix-up table of FIG. 26 is checked first. If the type identifier [type_indicator] indicates the insertion of the transform data containing the identification mark (type_indicato1=10b or 11b), [FM_ID_bit_position] in the fix-up table, namely, the bit position information of the ID determining the process mode of the transform data containing the identification mark is referenced. A position represented by a plurality of identification bits (FM_ID) in the fix-up table is identified. If the type identifier [type_indicator] is 10b, 0 bit is added to FM_ID bit_position. If the type identifier [type_indicator] is 11b, 64 bits are added to FM_bit_position. FM_ID is represented with a smaller number of bits in this way. The data of the bit position of identified FM_ID is thus acquired. If the FM_ID bit is 1, the member data of the content with the transform data applied thereto is transformed, and if the FM_ID bit is 0, the transform process is not performed (or vice versa).

In this way, the data corresponding to the player ID is embedded in the playback data. If the transform process is performed, first transform data [overwrite_value] and second transform data [overwrite_value_2] set in the fix-up table overwrite at two places. The erasure of the FM_ID data is made even more difficult while workload imposed on the playback apparatus is small in comparison with setting limitation on [overwrite_value]. If the type identifier [type_indicator] is 01b, the transform data is not the one with the identification mark, namely, the transform data to be substituted for the broken data, and the verification of FM_ID of the playback apparatus is not necessary in the transform process.

In the exclusive OR (XOR) operation in step S452, if the secret parameters SP1, SP2, SP3, . . . are XOR gating parameters set for the fix-up table (FUT) blocks, the table restoration process in step S452 is performed as below.

[fix-up table (FUT) block 1] (XOR) [SP1],
[fix-up table (FUT) block 2] (XOR) [SP2],
[fix-up table (FUT) block 3] (XOR) [SP3],
. . . .

By performing the exclusive OR gating process, the plain FUT block data is obtained. The above formula [A] (XOR) [B] represents an exclusive OR gating process of A and B.

In accordance with the fix-up table block, the writing operation of the transform data and the writing operation of the transform data containing the identification mark are performed on a portion of the member data of the content. The content playback periods of the fix-up table block are identical to that of the content playback process 7, in other words, a portion of each of content playback periods 0-T, T-2T, 2T-3T, . . . shown in FIG. 21. The same secret parameter is applied in each period.

In accordance with the present embodiment, the period throughout which the same secret parameter is applied is about 10 seconds in the normal playback mode as in the content playback process 7. Even if one secret parameter is leaked, a content of about 10 seconds can be played back. A secure content leak prevention mechanism is thus embodied.

Processes subsequent to the data transform process in step 5453 are identical to those described in the content playback process 7, and are performed on a real-time basis in parallel with one of the content playback operation and the content output operation. More specifically, the demultiplexing process is performed in step S454, and the decode process is performed in step S455. These processes are performed on a real-time basis in parallel with one of the content playback operation and the content output operation.

In the content playback process 8, the real-time event handler 361 controls the table restoration in step S452 and the data transform process in step S453 while monitoring an event that may occur during one of the content playback operation and the content output operation. Alternatively, the data transport process may be performed without performing event monitoring. In such a case, the real-time event handler 361 of FIG. 23 is dispensed with as shown in FIG. 27.

In the content playback process 8, fix-up table (FUT) blocks, divided from the member of the fix-up table corresponding to the entire content, are associated with the different secret parameters (SPn). The exclusive OR gating process is thus performed with the different secret parameters (SPn) respectively applied to the FUT blocks before the fix-up table (FUT) blocks are stored in the information recording medium. The secure VM 356 generates intermittently the secret parameters, etc. Even if a part of the secret parameters is leaked, the entire transform data stored in the fix-up table cannot be acquired. As a result, the entire content cannot be restored; and a more secure content usage and management mechanism is established.

As in the process discussed with reference to FIG. 10, this process sequence is performed on a real-time basis without affecting the process of content playback and outputting. If an illegal process is found in the content playback process, the secure VM 356 suspends the process thereof in response to illegal process detection information from the event handler 354. The generation of the transform data is quit, and the content playback operation and the content output operation of an illegal content are thus suspended in the middle thereof.

The data structures of the member data of the fix-up table are discussed with reference to FIGS. 24 through 26. The fix-up table may take any of a variety of data structures. For example, the fix-up table described with reference to FIG. 24 may be rearranged into a fix-up table of FIG. 28. FIG. 28 illustrates the fix-up table of FIG. 24 in a different structure. The secret parameter (SP) number can be replaced with a block number of a fix-up table block. [First SPN for FUT block] can be replaced with the value of the [first "Base SPN for FixUpEntry" within FUT block ( )] defined in FIG. 25. ["Base SPN for FixUpEntry"] is not obfuscated by an XOR gating operation with the secret parameter (SPn), and is used to determine which fix-up table block (FUT block ( )) to use during random access even when no secret parameter (SP) is present. The table of FIG. 28 simple in structure provides the same information as the fix-up table of FIG. 24.

[4. Structure of the Information Processing Apparatus]

The hardware structure of an information processing apparatus executing the application program as a host is described below with reference to FIG. 29. The information processing apparatus 800 includes a CPU 809 performing data processing in accordance with a variety of programs including an OS, a content playback application program, a content recording application program, and a mutual authentication program, a ROM 808 and a memory 810, each serving as a storage area storing the programs, parameters, etc., an input and output I/F 802 inputting and outputting digital signals, an input and output I/F 804 containing an A/D converter and a D/A converter and inputting and outputting analog signals, an MPEG codec 803 performing an encode/decode process on MPEG data, a TS/PS processor 806 performing TS (Transport Stream) and PS (Program Stream) process, an encryption processor 807 performing a variety of encryption processes including the mutual authentication process and the encryption process, a recording medium 812, such as a hard disk, a drive 811 driving the recording medium 812 and inputting and outputting data record and playback signals, and a bus 801 mutually interconnecting these elements.

The information processing apparatus (host apparatus) 800 is connected to the drive 811 via a bus, such as ATAPI-BUS. The fix-up table and the content are input and output via the digital signal input and output I/F 802. The encryption processor 807 performs an encryption process and a decryption process using the AES algorithm.

The program for performing the content playback process and the content recording process is stored in the ROM 808. During the execution of the program, parameters and data are stored in the memory 810 as a work area.

Stored in one of the ROM 808 and the recording medium 812 are the public key of the control center, the host secret key, the host public key certificate, and the drive CRL as the revocation list.

The data transform program acquired from the information recording medium is used to perform the content playback operation and the content output operation. The content playback processes 1-8 including the decryption of the encrypted content, the restoration of the fix-up table, and the data write operation of the transform data in accordance with the transform data of the fix-up table, are thus performed.

[5. Information Recording Medium Manufacturing Apparatus and Information Recording Medium]

An information recording medium manufacturing apparatus and an information recording medium are described below. More specifically, the apparatus and method for manufacturing the information recording medium and the information recording medium are described below.

The information recording medium manufacturing apparatus manufactures the information recording medium 100 that stores the recording data discussed with reference to FIG. 1.

The information recording medium manufacturing apparatus includes a data processor for generating a content containing broken data different from authorized content member data, a fix-up table holding transform data as the authorized content member data that is substituted for the broken data, and having setting position information regarding the content of the transform data, and a data transform program containing an execution command of executing a substitution process on the content member data with the fix-up table applied, and a data recorder for recording the content containing the broken data, the fix-up table, and the data transform program onto an information recording medium.

In the information recording medium manufacturing apparatus of one embodiment of the present invention, the data processor generates the fix-up table holding the transform data therewithin selectively applied based on identification information of one of a content playback apparatus and a content playback application program, and the data recorder records the fix-up table holding the transform data that is selectively applied based on the identification information. In the information recording medium manufacturing apparatus of another embodiment of the present invention, the data processor generates the fix-up table that is obfuscated using one of a calculation process and an encryption process, the one of the calculation process and the encryption process applying different parameters to partial fix-up tables that hold the transform data corresponding to only a part of the member data of the content, and the data recorder records the obfuscated fix-up table.

In the information recording medium manufacturing apparatus of yet another embodiment of the present invention, the data processor generates content data in which the obfuscated fix-up table is dispersed in stream packets of the content containing the broken data, and the data recorder records the content data containing the obfuscated fix-up table dispersed therewithin.

As previously discussed with reference to FIG. 1, the information recording medium manufactured by the manufacturing apparatus stores (a) the content containing broken data different from authorized content member data, (b) the fix-up table holding transform data as the authorized content member data that is substituted for the broken data, and having setting position information regarding the content of the transform data, and (c) the data transform program containing an execution command of executing a substitution process on the content member data with the fix-up table applied.

In accordance with one embodiment of the present invention, the fix-up table recorded on the information recording medium includes the transform data that is substituted for a portion of the held data, the fix-up table containing setting position information regarding the content of the transform data, and the data transform program containing an execution command of executing a substitution process on the content member data with the fix-up table applied, and the registration information of the fix-up table includes a type identifier identifying whether registration information is (p) registration information and (q) registration information, wherein (p) the registration information is related to the transform data for transforming broken data into authorized content data and (q) the registration information is related to the transform data containing an identification mark for embedding identification information of one of a content playback apparatus and a content playback application program.

If the registration information of the fix-up table is related to the transform data containing the identification mark for embedding the identification information of the one of the playback apparatus and the content playback application program, the registration information of the fix-up table further includes the transform data that is selectively applied based on the identification information of the one of the content playback apparatus and the content playback application program. The fix-up table includes position information of a bit, to be referenced to determine a process mode, from among a plurality of bits of the identification information of the one of the playback apparatus and the playback application program.

The fix-up table is obfuscated using one of a calculation process and an encryption process, the one of the calculation process and the encryption process applying different parameters to partial fix-up tables that hold the transform data corresponding to only a part of the member data of the content. For example, the information recording medium stores, as record data, content data in which the obfuscated fix-up table is dispersed in stream packets of the content containing the broken data.

The present invention has been discussed with reference to the particular embodiments. It is obvious to those skilled in the art that modifications and changes are possible without departing from the scope of the present invention. The above-referenced embodiments have been discussed for exemplary purposes only, and are not intended to limit the scope of the present invention. The scope of the present invention is determined solely by reference to the claims appended thereto.

The above-references series of steps can be performed by software, hardware or a combination of both. If the series of steps is performed by software, a program forming the software is installed to a memory in a computer incorporated in dedicated hardware, or a general-purpose computer enabled to perform a variety of processes.

The program can be pre-stored onto one of a hard disk and a ROM (read-only memory), as a recording medium. The program can also be temporarily or permanently stored (recorded) in one of removable recording media including a flexible disk, a CD-ROM (Compact Disk Read-Only Memory), a MO (magneto-optical) disk, a DVD (digital versatile disk), a magnetic disk, and a semiconductor memory. Such removable media can be supplied as so-called package media.

The program can be installed from one of the above-referenced recording media to the computer. Furthermore, the program can be transferred to the computer from a download site in a wireless fashion or a wired fashion via a network such as a LAN (Local Area Network) or the Internet. The computer receives the transferred program and stores the program onto a recording medium such as a built-in hard disk.

The process steps discussed in this specification are sequentially performed in the time sequence order as stated. Alternatively, the steps may be performed in parallel or separately. In this specification, the word system refers to one or a plurality of apparatuses.

INDUSTRIAL APPLICABILITY

As described above, in accordance with one embodiment of the present invention, the content containing the broken data different from the correct content member data is recorded on the information recording medium. Furthermore, the transform data, as the correct member data, to be substituted for the broken data, and the fix-up table storing the setting position information of the content are recorded on the information recording medium. During the content playback process, the transform data is substituted for the content member data in accordance with the fix-up table recorded on the information recording medium. Even if the encryption key corresponding to the encrypted content recorded on the information recording medium is leaked, the apparatus unable to acquire the transform data cannot play back the content. Unauthorized use of the content is thus controlled.

In accordance with one embodiment of the present invention, the transform data contains data for analyzing member bits of identification information identifying one of the content playback apparatus and the content playback application program. Even if an unauthorized content is leaked, a source of leaking of the unauthorized content is identified by analyzing the transform data.

In accordance with one embodiment of the present invention, one of the calculation process and the encryption process applies different parameters to partial fix-up tables that hold the transform data corresponding to only a part of the member data of the content. Even if a particular parameter is leaked, playback of only a portion of the content is permitted, and the possibility of playing back the whole content is reduced.

BRIEF DESCRIPTION OF THE DRAWINGS

FIG. 9 illustrates the data structure of a data fix-up table recorded on the information recording medium.

FIG. 11 illustrates a content playback process 3.

FIG. 12 illustrates the data structure of the fix-up table that has been obfuscated on a per fix-up table (FUT) block basis.

FIG. 13 illustrates the data structure of the fix-up table that has not been obfuscated on a per fix-up table (FUT) block basis.

FIG. 19 illustrates the data structure of a divided fix-up table.

FIG. 20 illustrates a fix-up table that is dispersed in particular packets in the data of an encrypted content.

FIG. 24 illustrates the entire data structure of the fix-up table.

FIG. 25 illustrates the data structure of one fix-up table (FUT) block from among a plurality of fix-up table (FUT) blocks contained in the fix-up table.

FIG. 26 illustrates the data structure of a transform data entry in the fix-up table (FUT) block.

FIG. 28 illustrates a modification of the fix-up table.

REFERENCE NUMERALS

Figure 1:
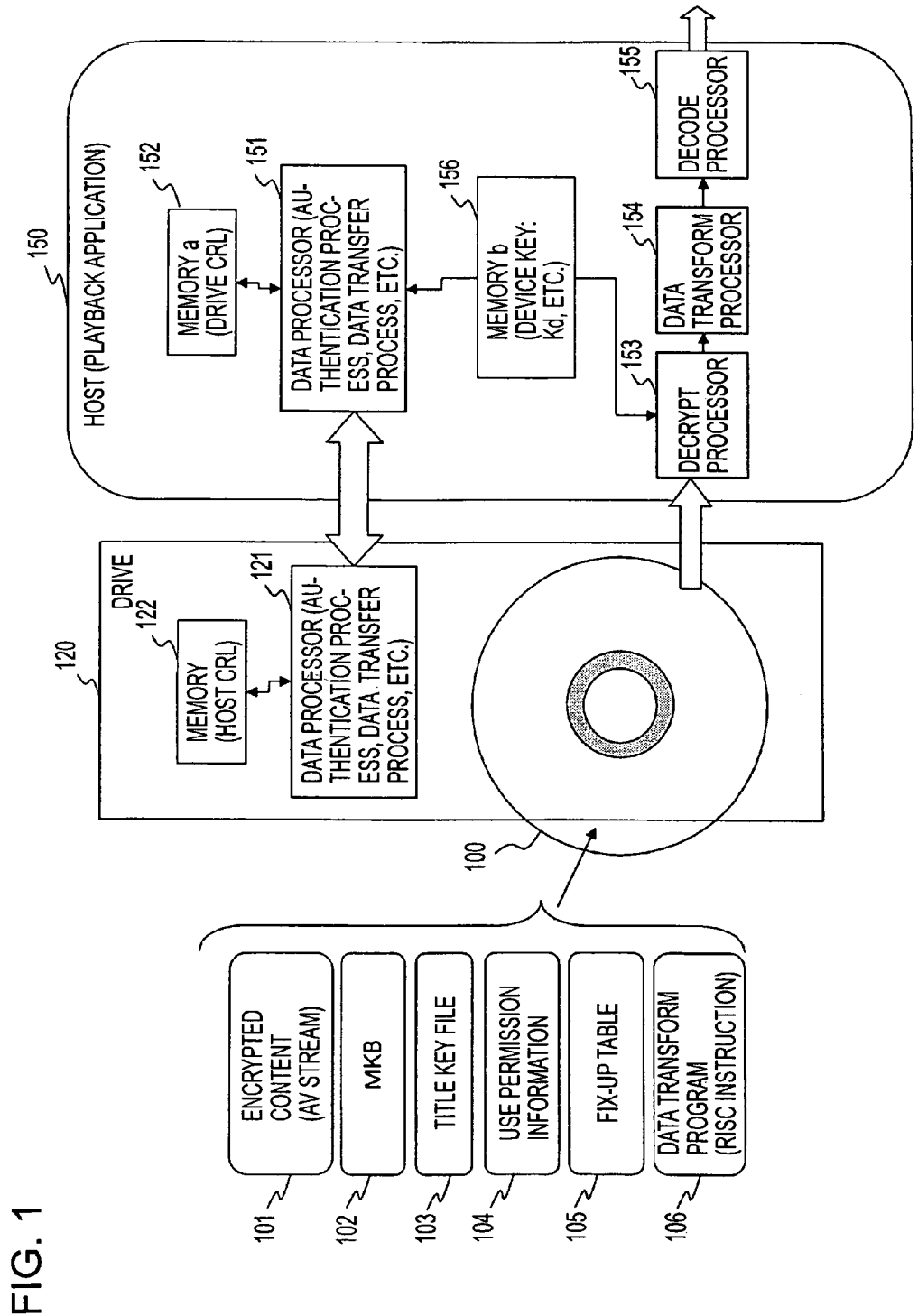
FIG. 1 illustrates the structure of storage data of an information recording medium, and the structure and process of a drive and an information processing apparatus.
Figure 2:
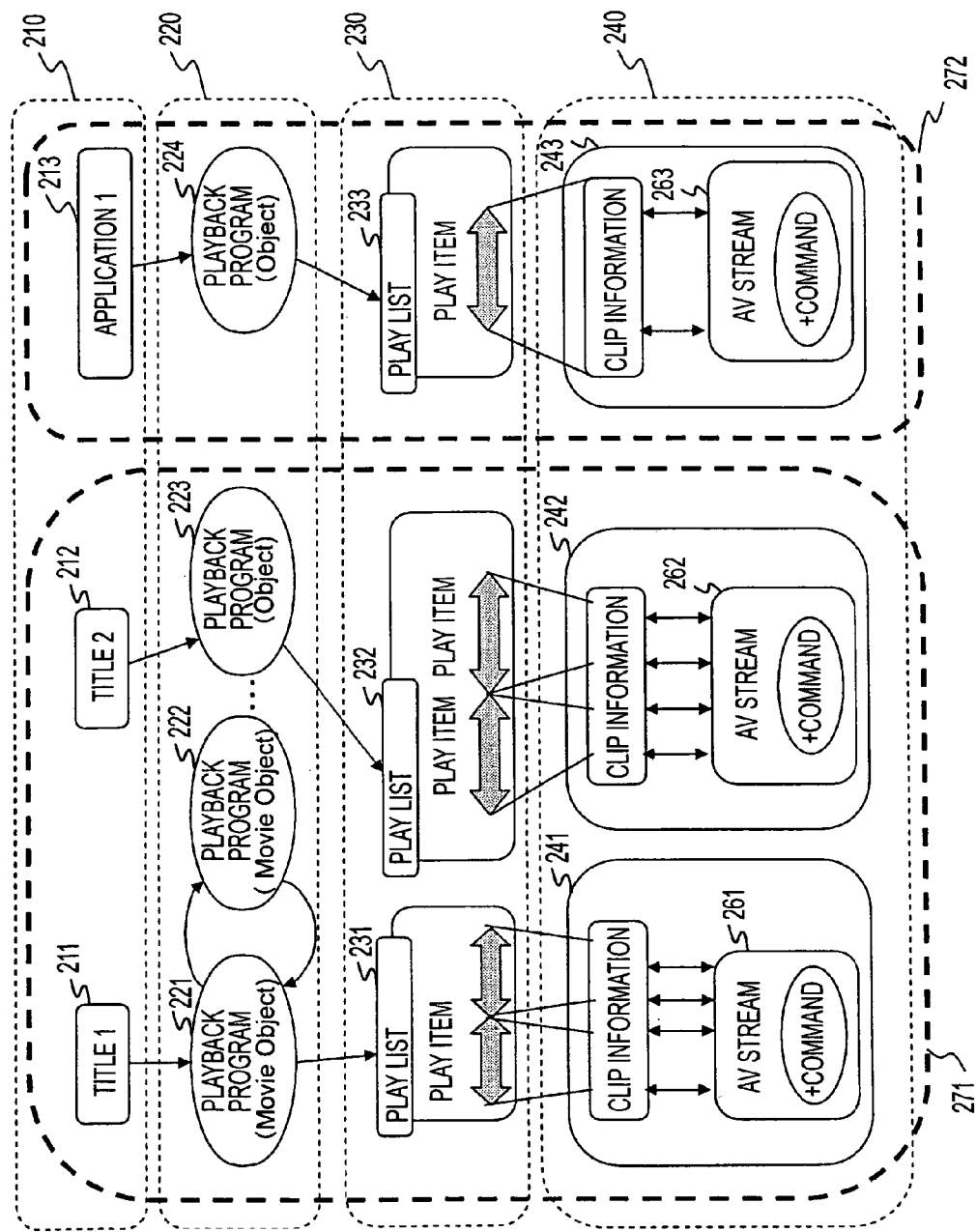
FIG. 2 illustrates a setting example of a content management unit set in a storage content on the information recording medium.
Figure 3:
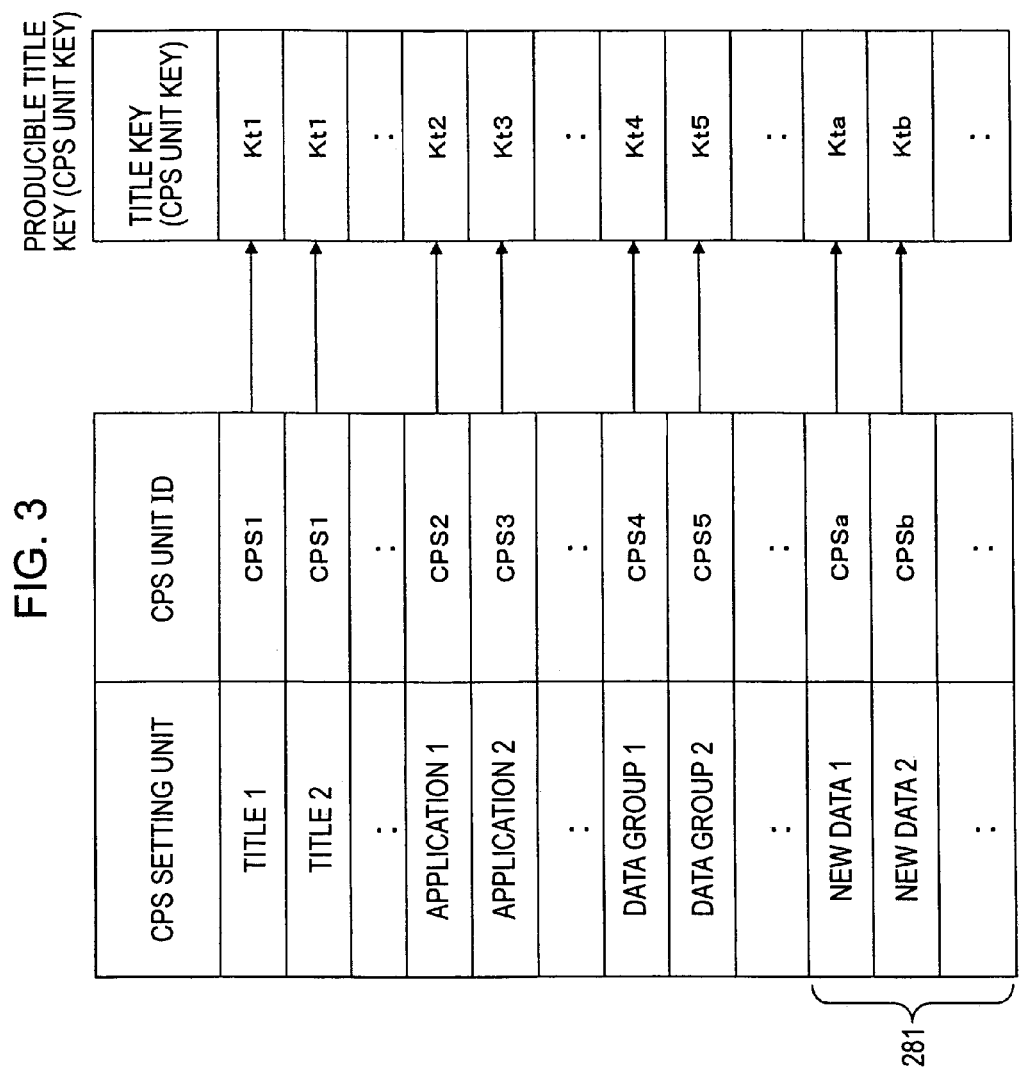
FIG. 3 illustrates a correspondence between the content management unit set in the storage content on the information recording medium and a unit key.
Figure 4:
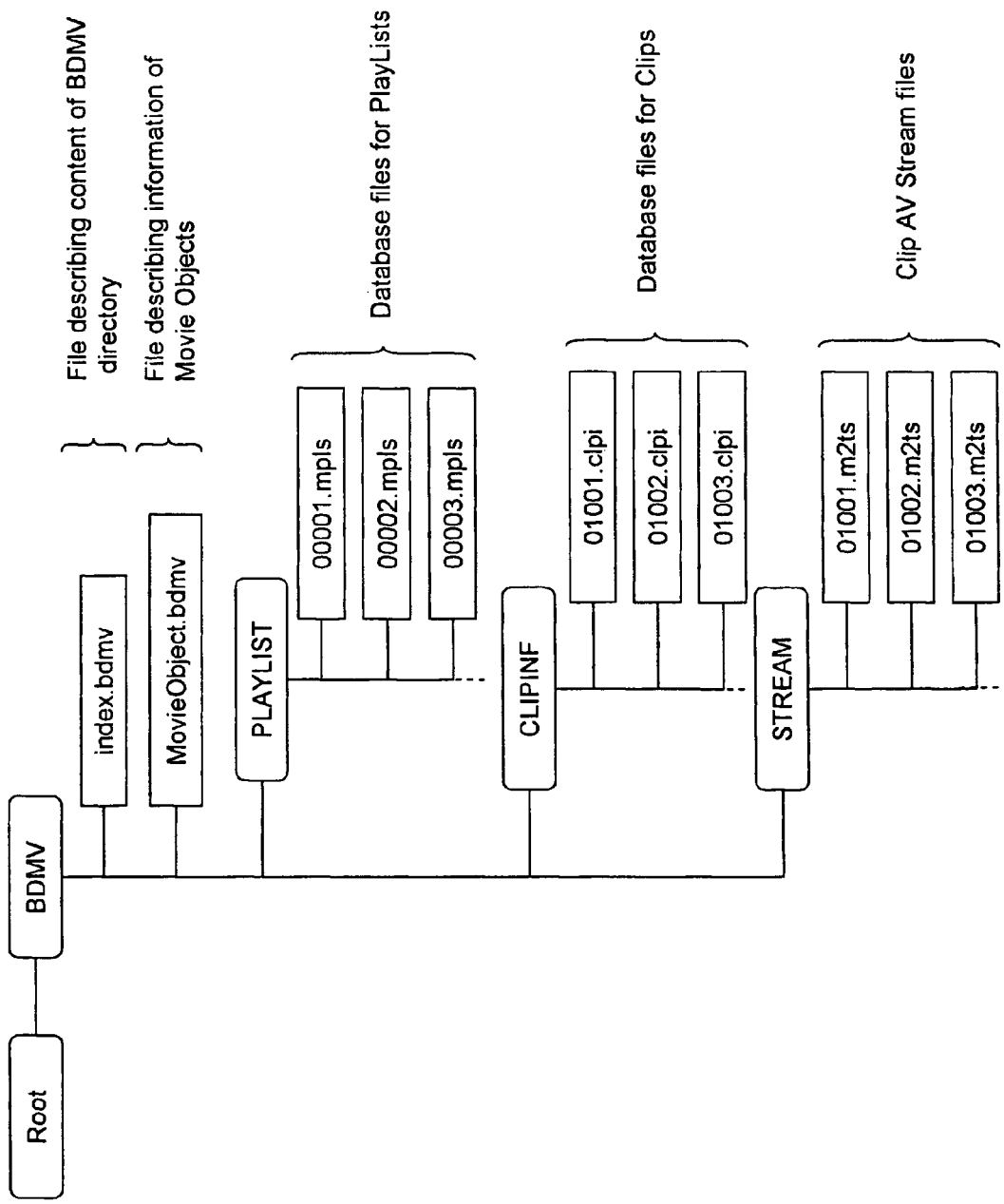
FIG. 4 illustrates the structure of a directory set in the storage content in the information recording medium.
Figure 5:
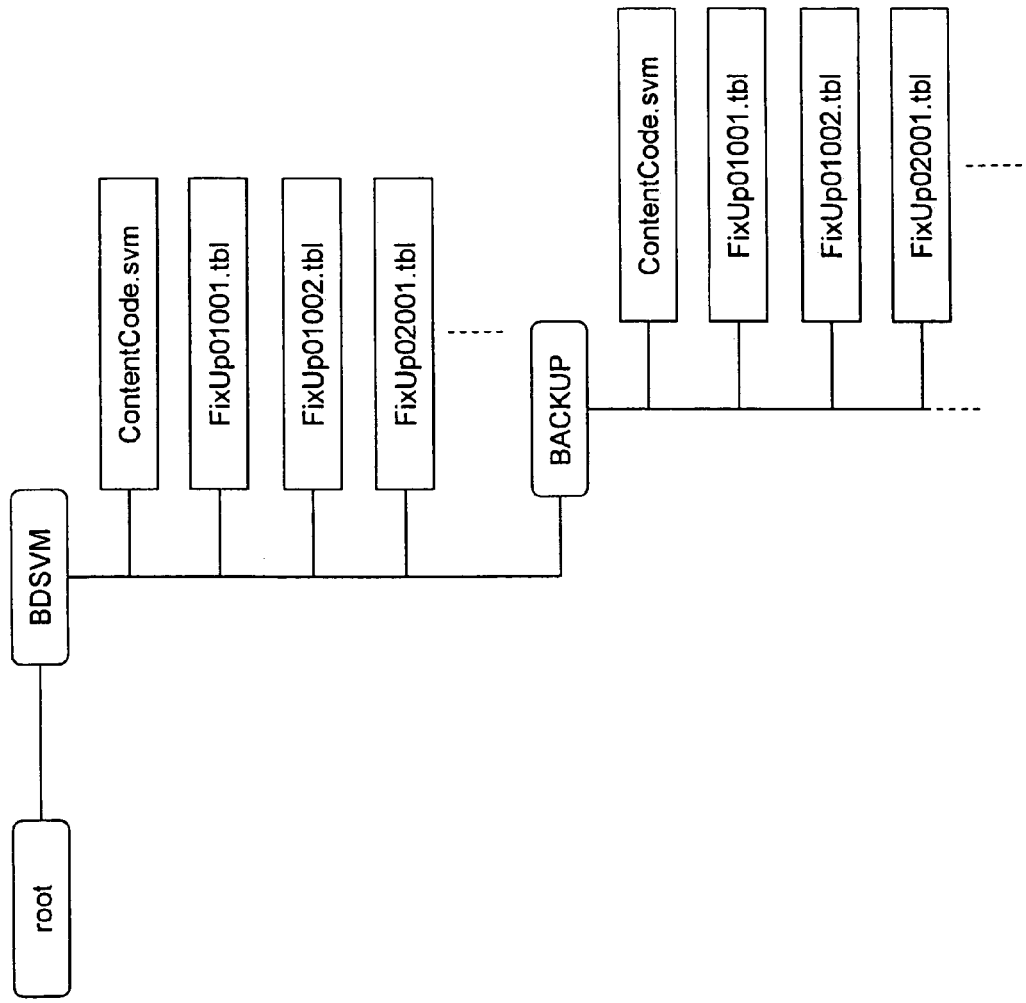
FIG. 5 illustrates a fix-up table and the structure of a directory of a data transform program.
Figure 6:
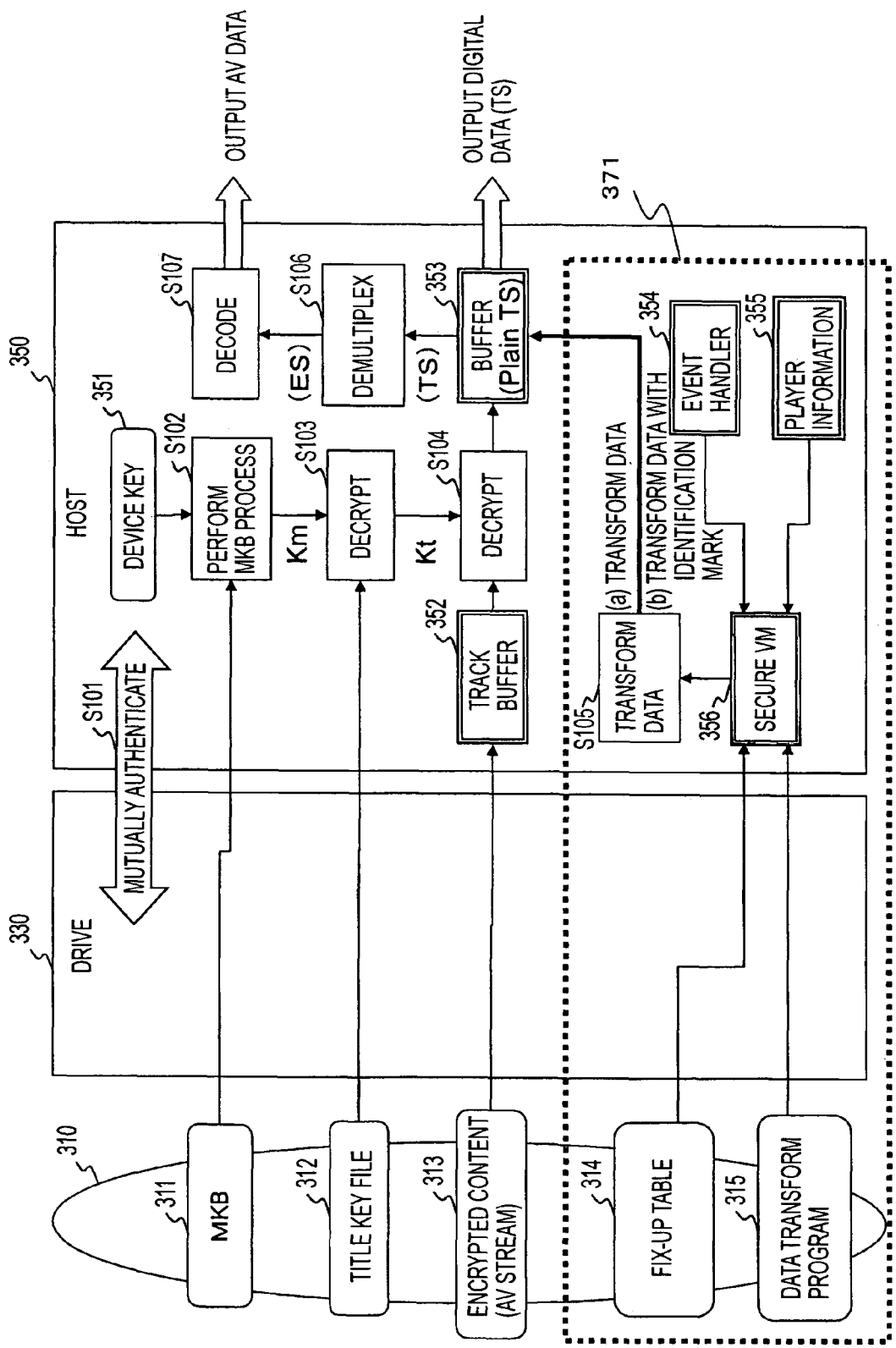
FIG. 6 illustrates a content playback process 1.
Figure 7:
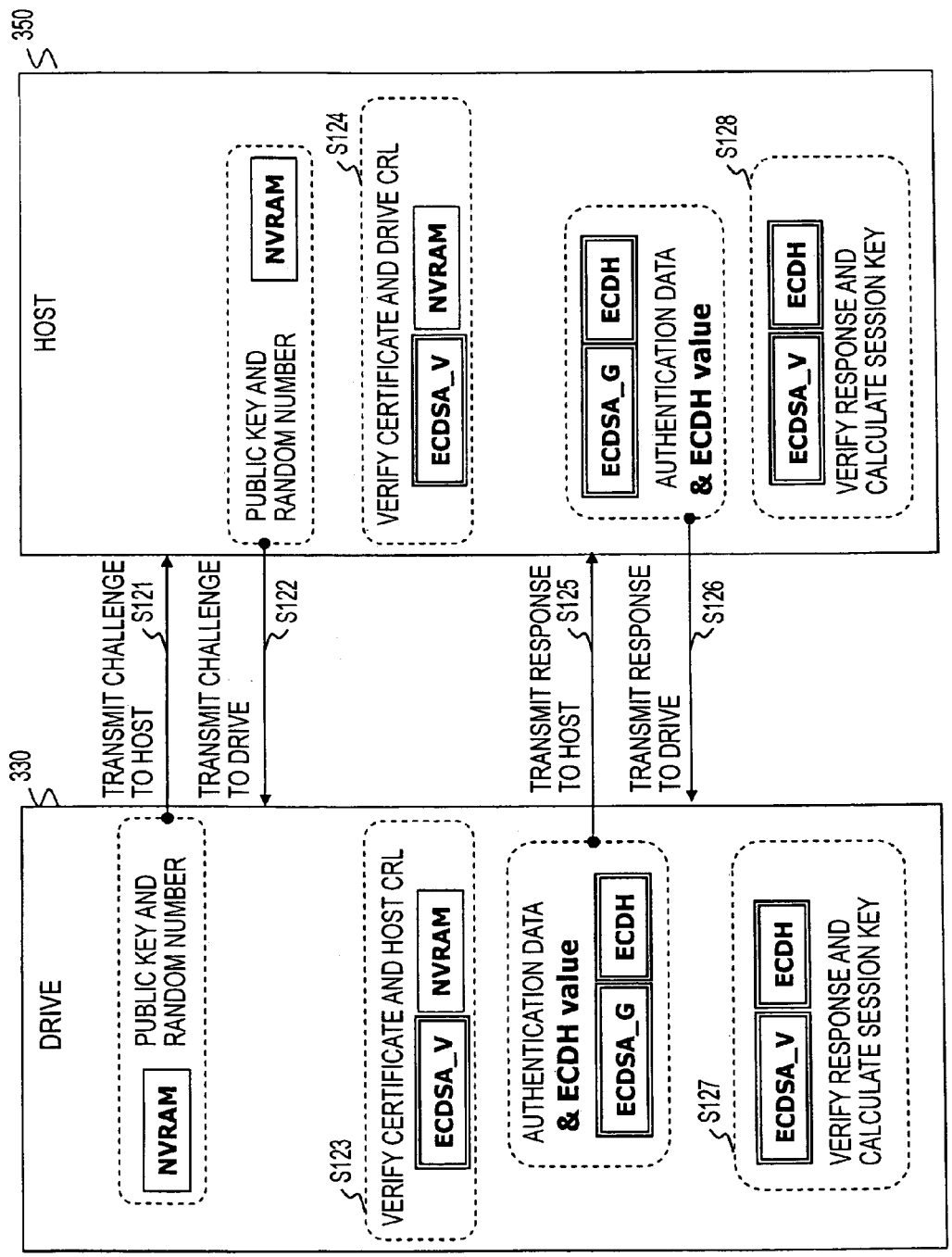
FIG. 7 illustrates a mutual authentication sequence performed between a drive and a host apparatus.
Figure 8:
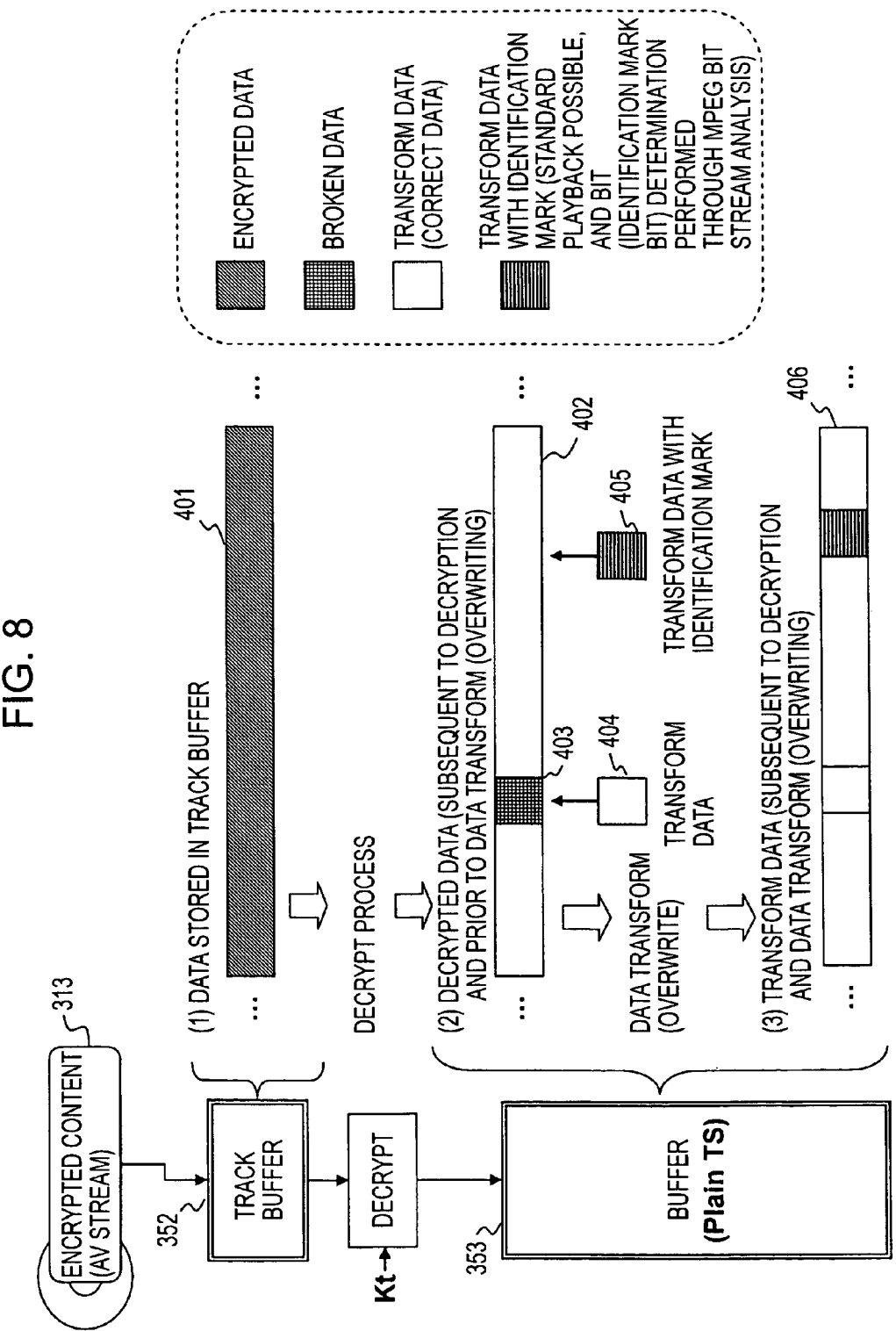
FIG. 8 illustrates an application process of transform data performed during content playback.
Figure 10:
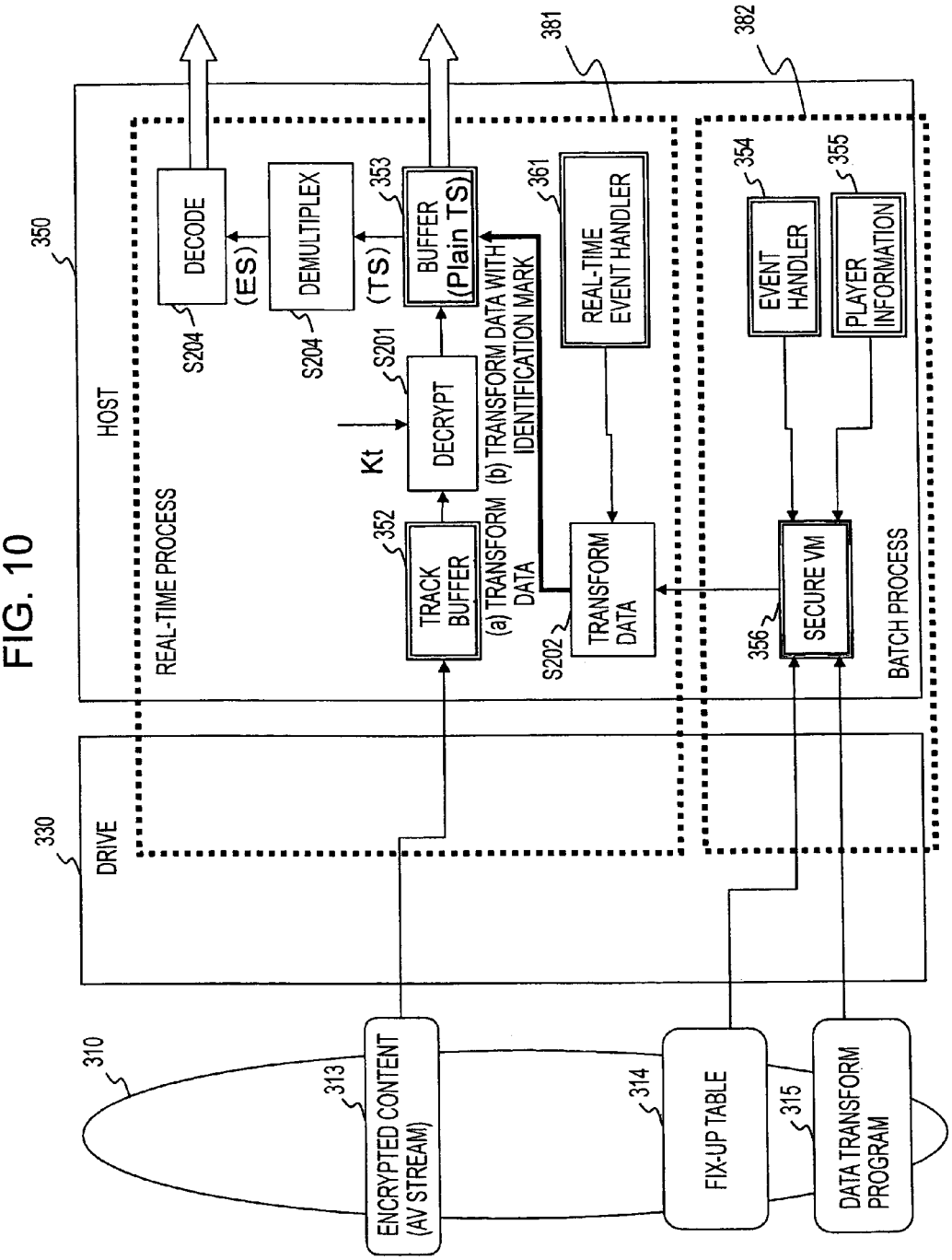
FIG. 10 illustrates a content playback process 2.
Figure 14:
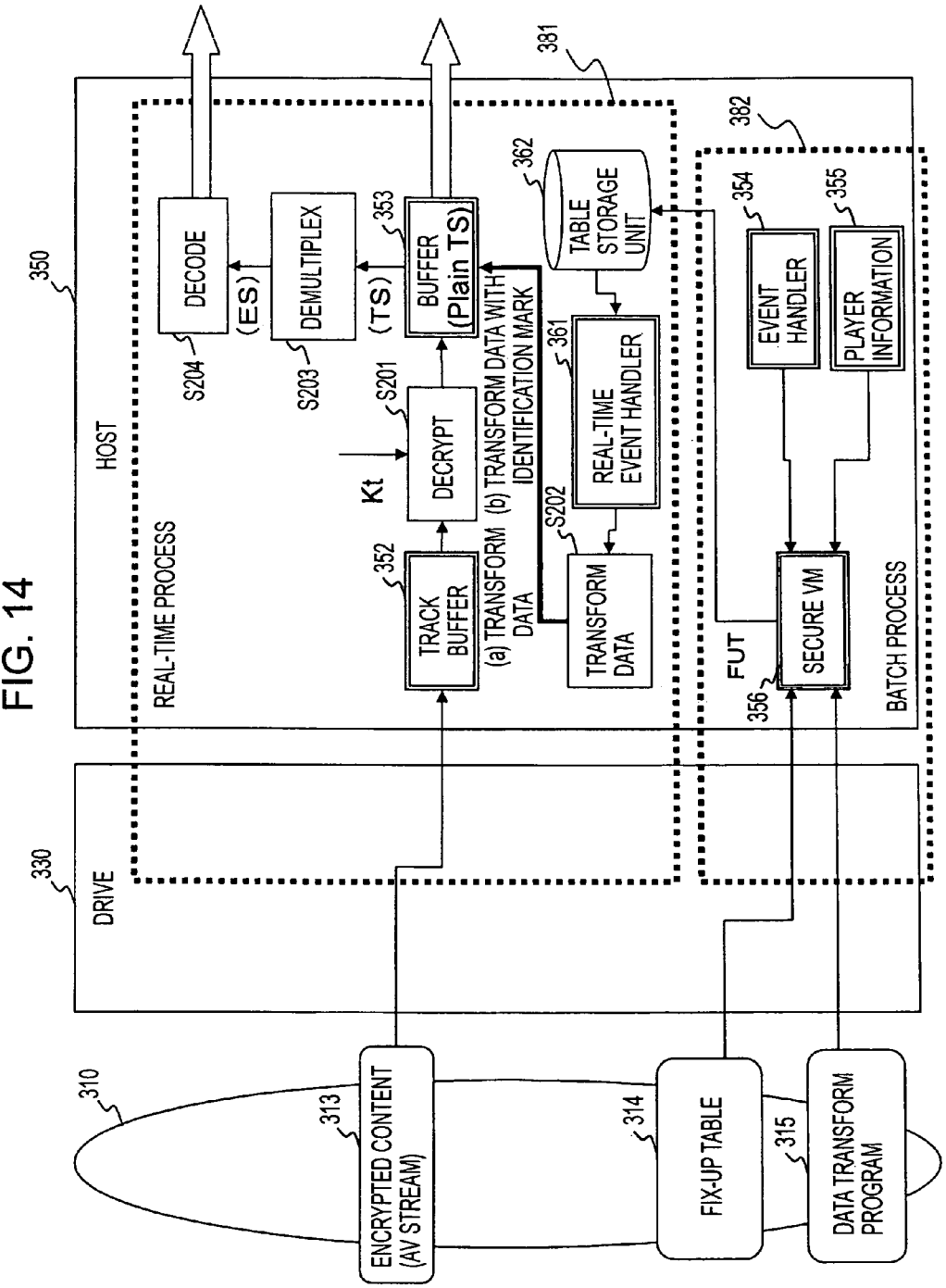
FIG. 14 illustrates a content playback process 4.
Figure 15:
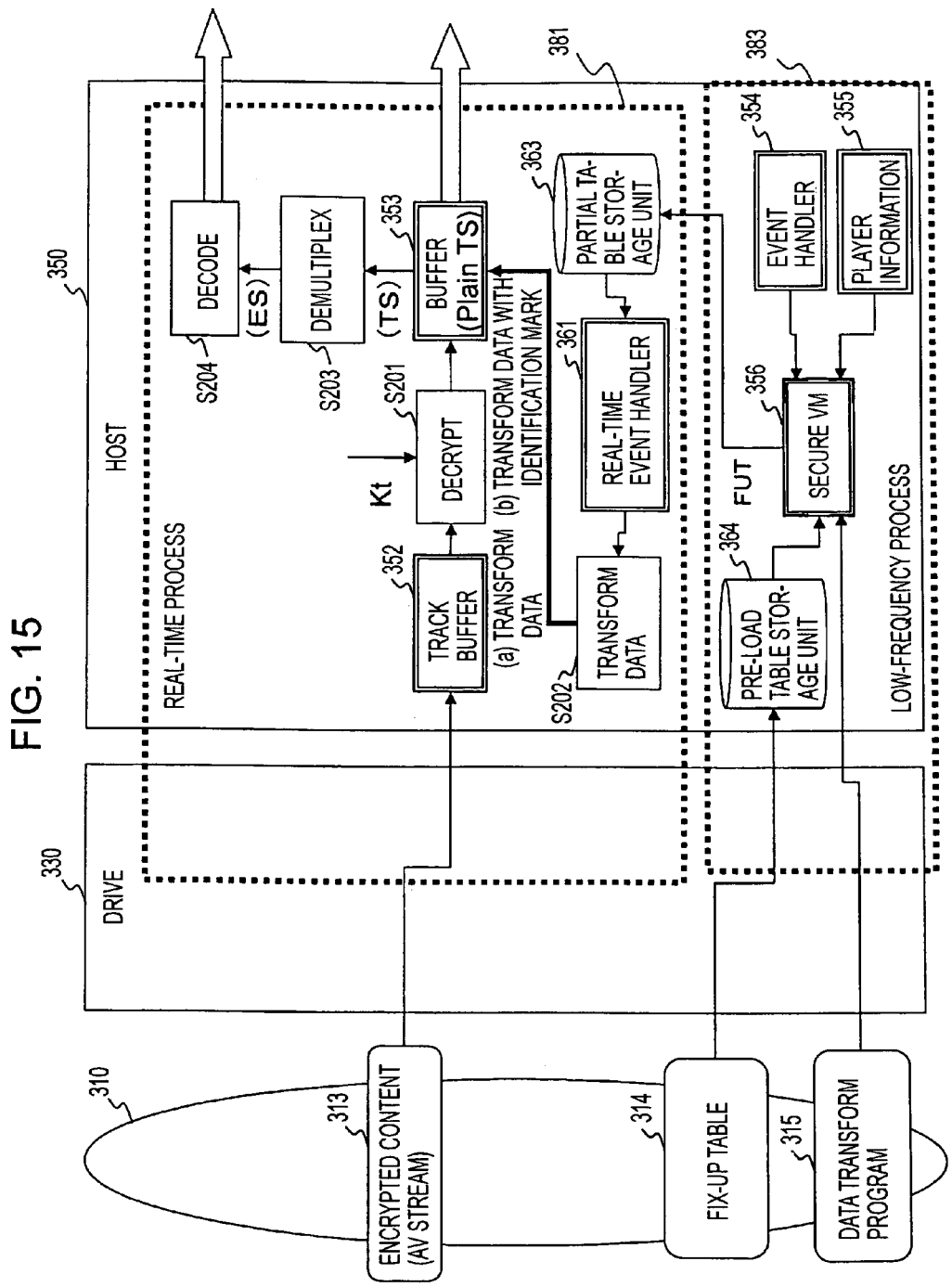
FIG. 15 illustrates a content playback process 5.
Figure 16:
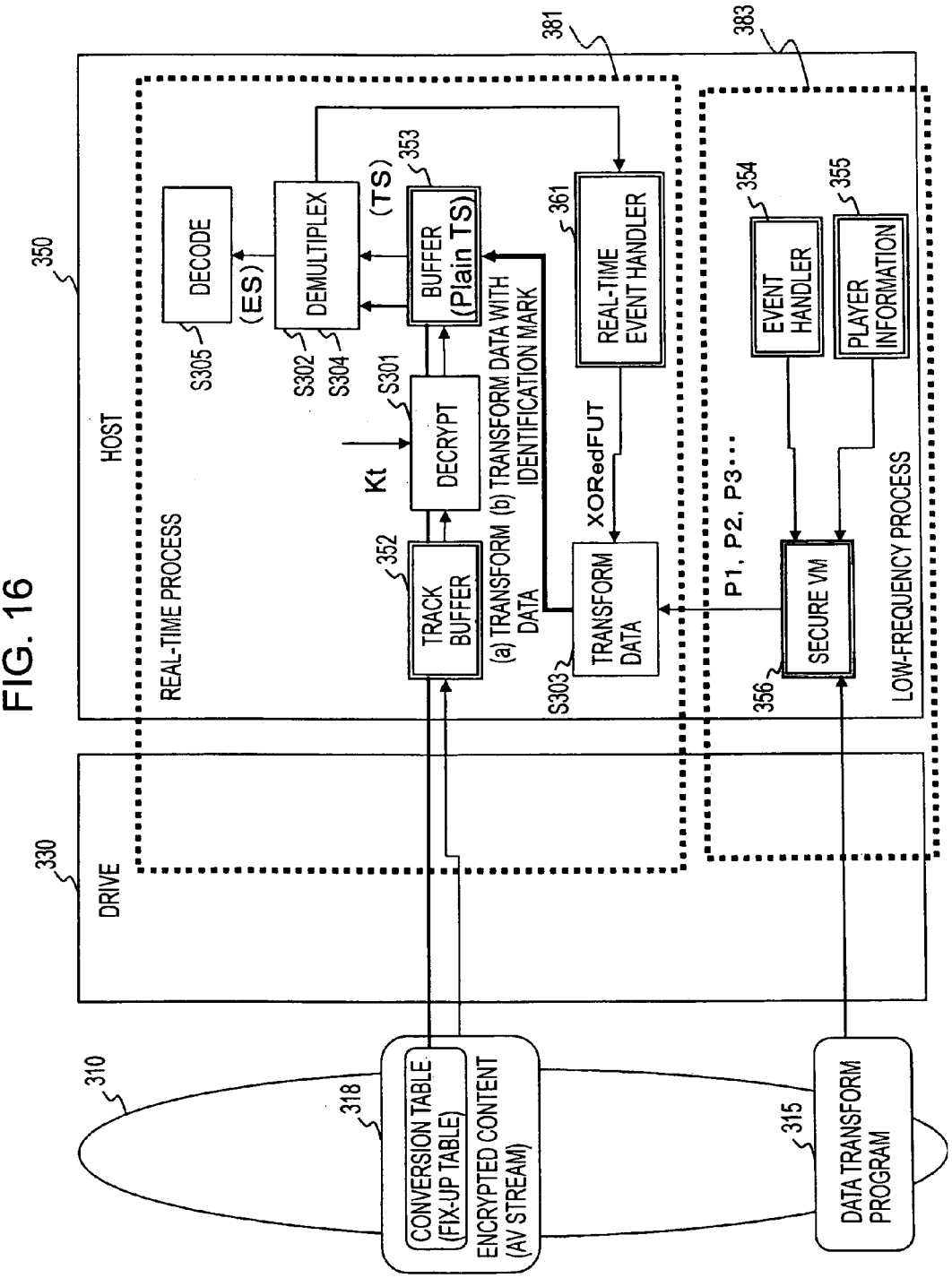
FIG. 16 illustrates a content playback process 6.
Figure 17:
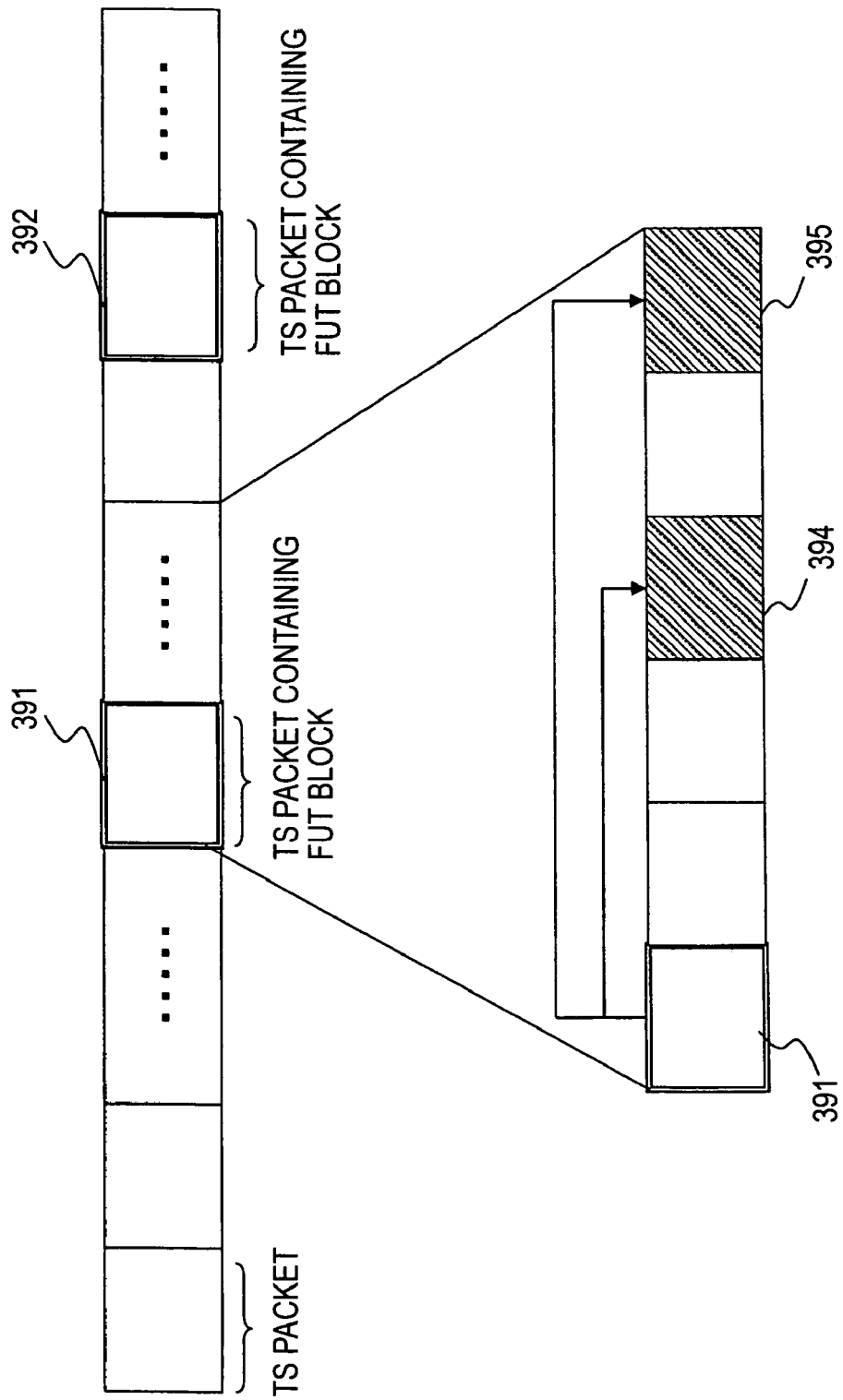
FIG. 17 illustrates the data structure of the fix-up table that is stored in a transport stream packet containing a content.
Figure 18:
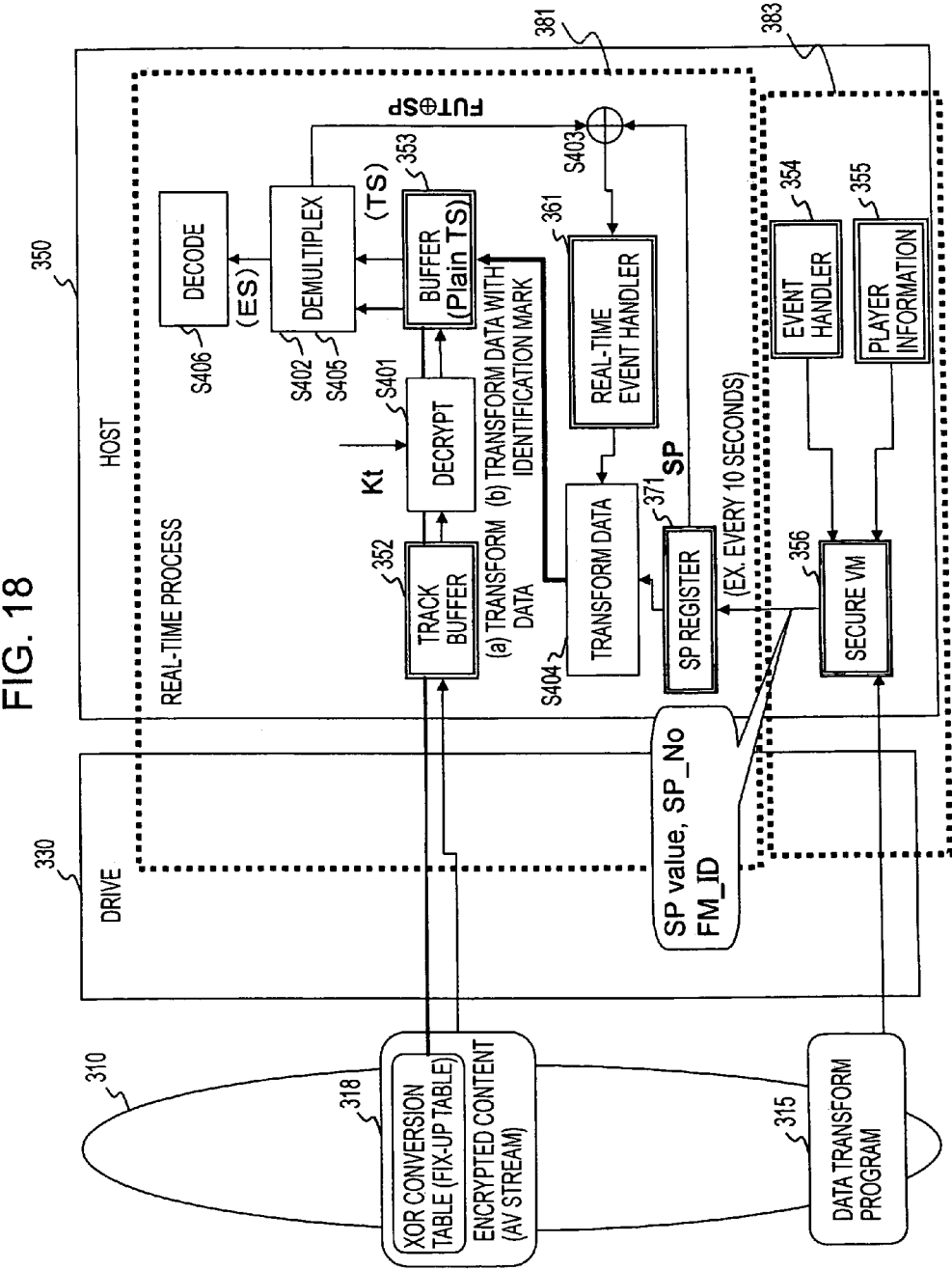
FIG. 18 illustrates a content playback process 7.
Figure 21:
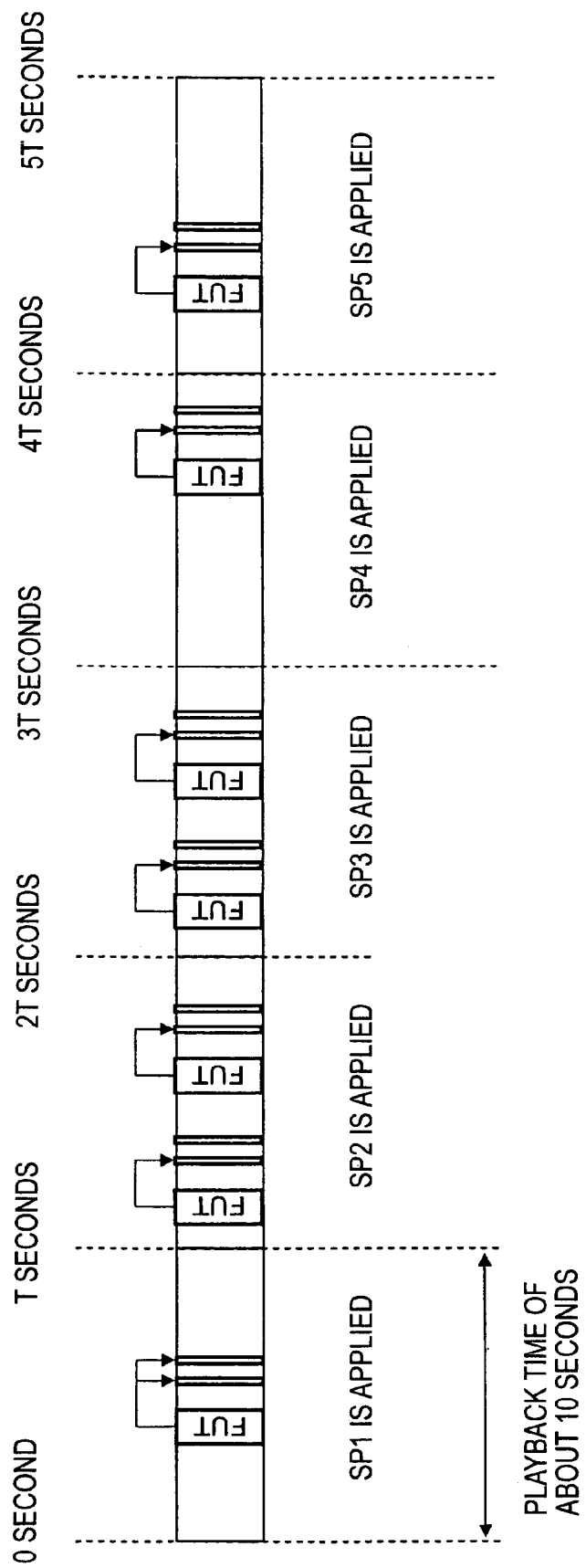
FIG. 21 illustrates a write configuration of the transform data.
Figure 22:
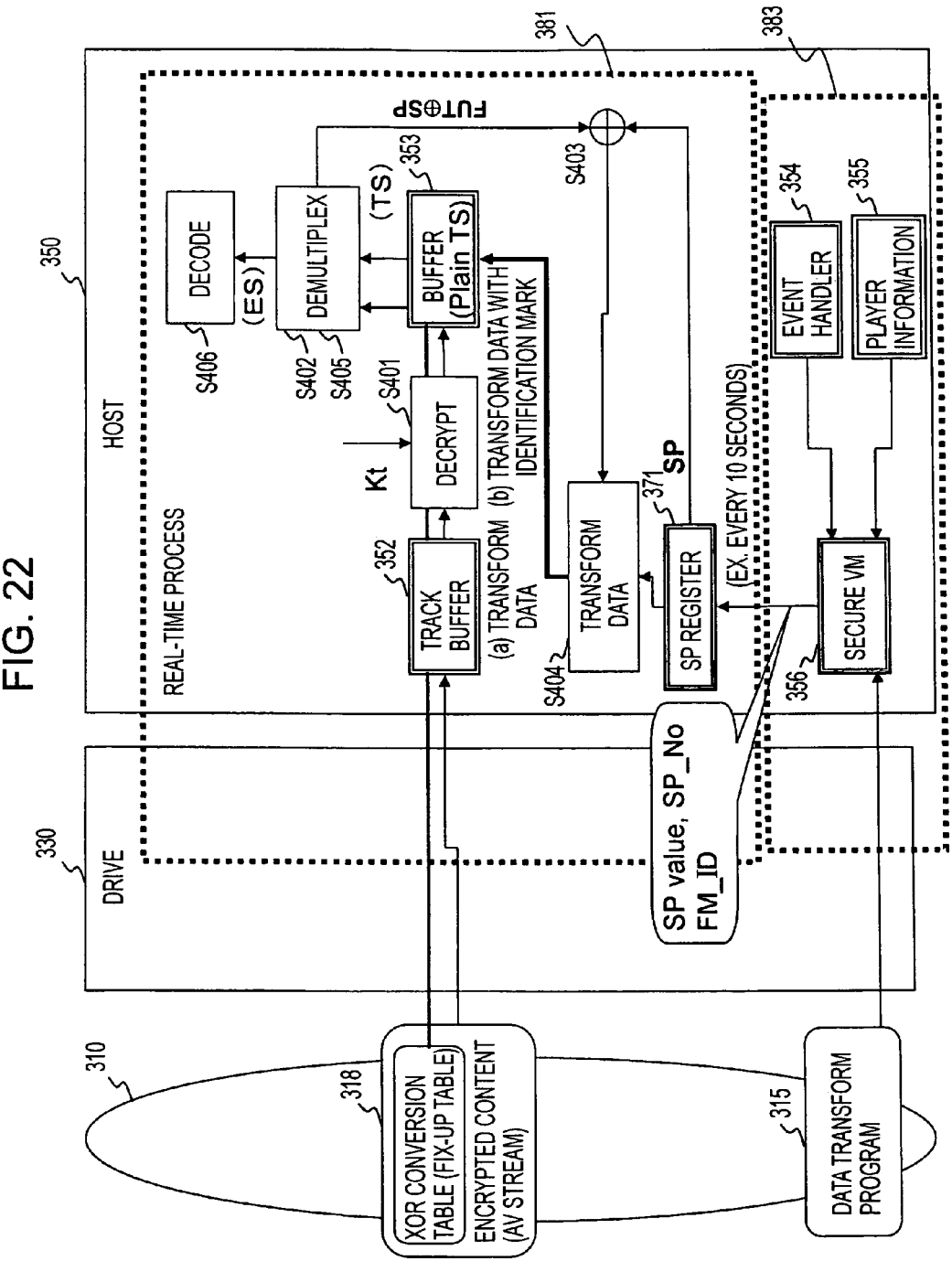
FIG. 22 illustrates a modification of the content playback process 7.
Figure 23:
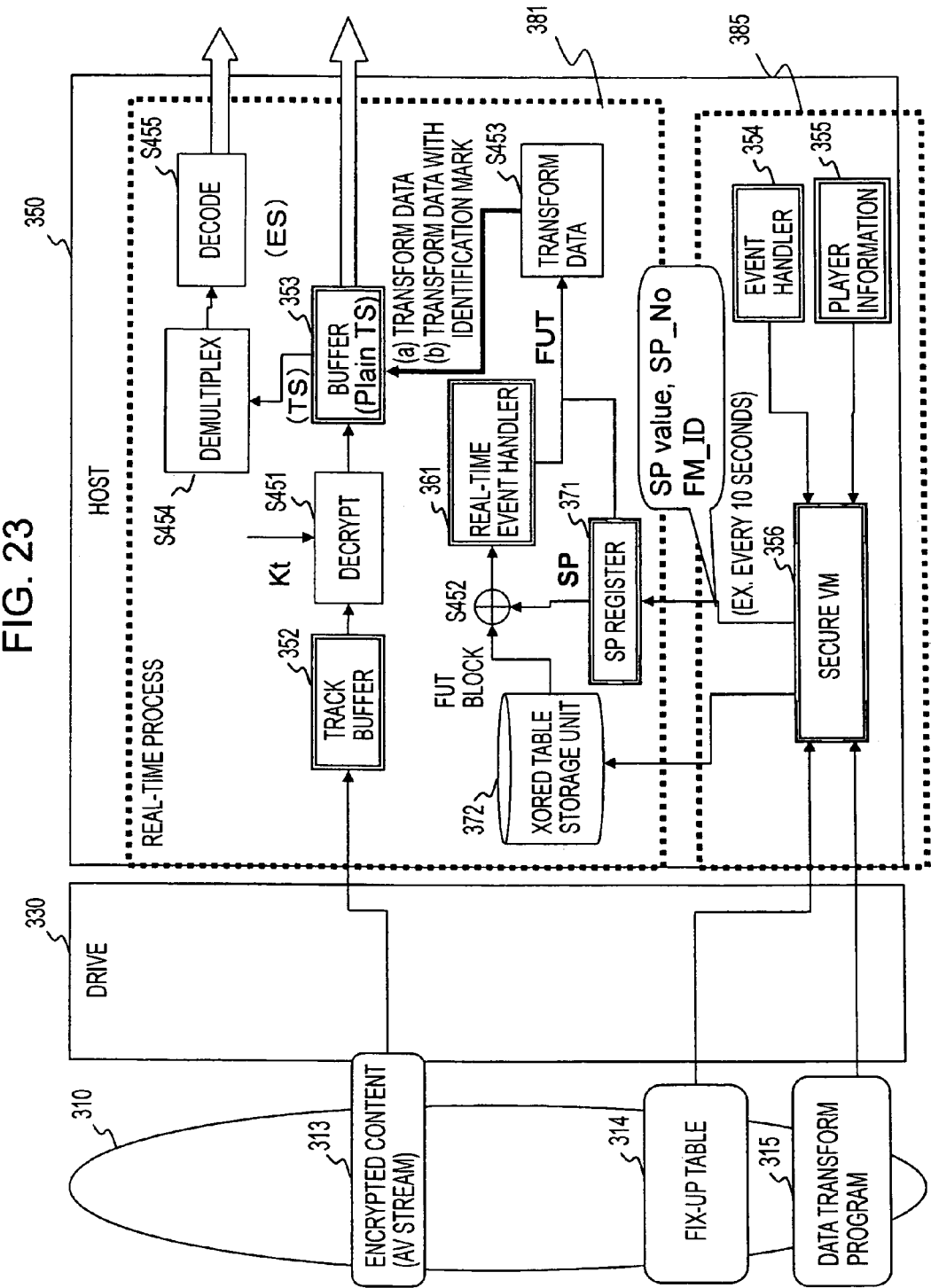
FIG. 23 illustrates a content playback process 8.
Figure 27:
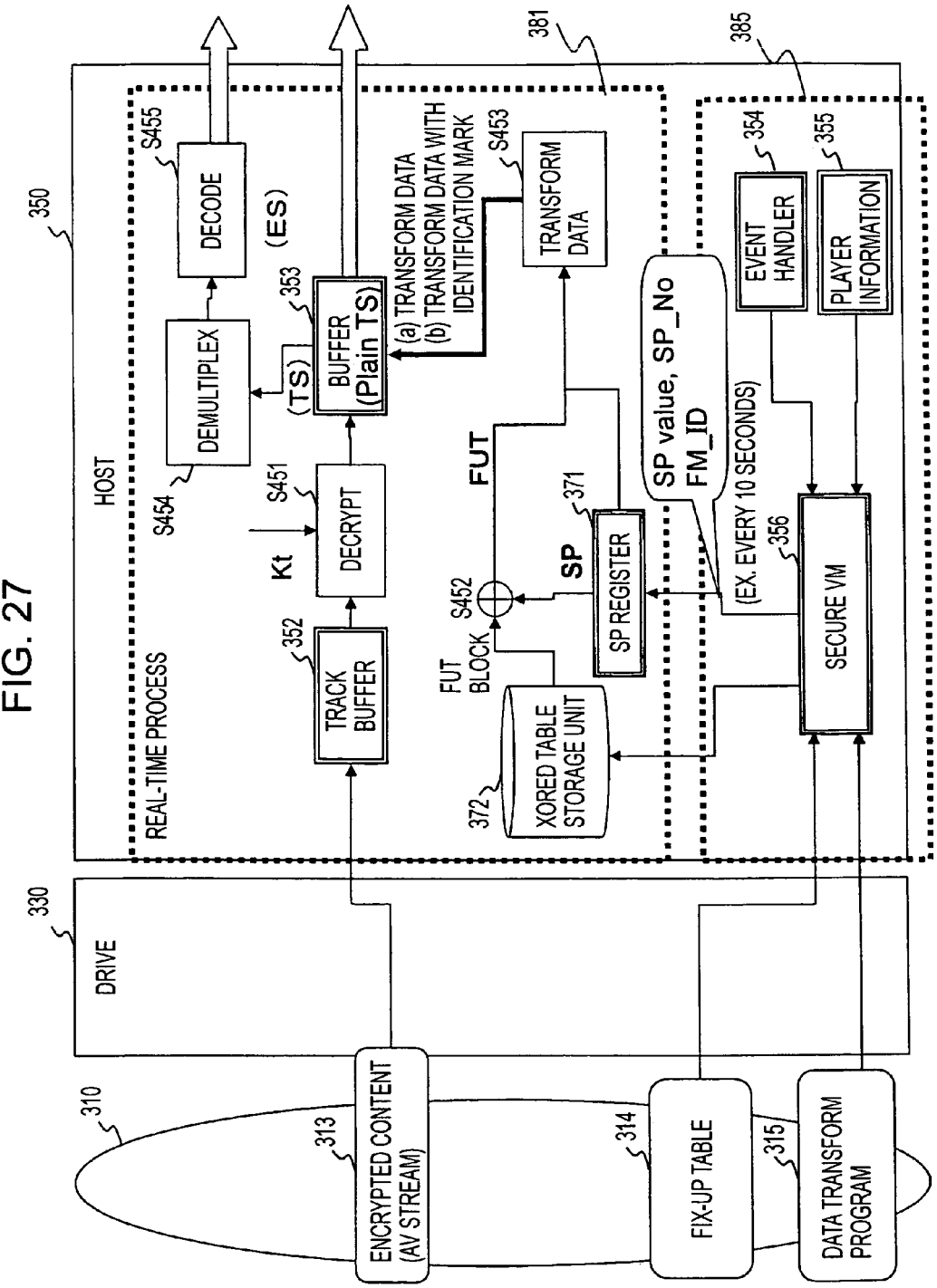
FIG. 27 illustrates a modification of the content playback process 8.
Figure 29:
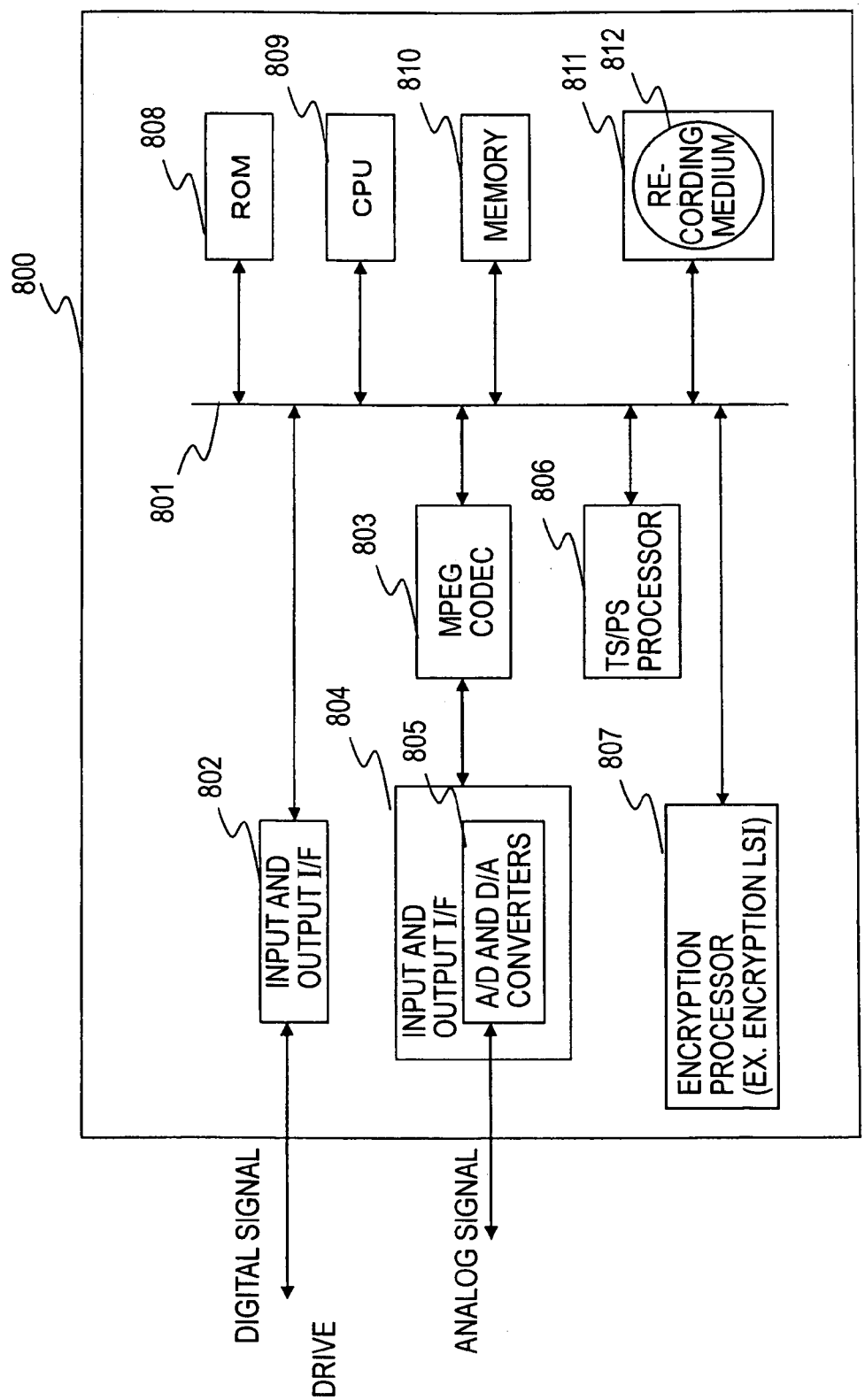
FIG. 29 illustrates the hardware structure of the information processing apparatus executing an application program as a host apparatus.

100 Information recording medium
101 Encrypted content
102 MKB
103 Title key file
104 Use permission information
105 Fix-up table
106 Data transform program
120 Drive
121 Data processor
122 Memory
150 Host
151 Data processor
152 Memory a
153 Decrypt processor
154 Data transfer processor
155 Decode processor
156 Memory b
210 Index
220 Movie object
230 Play list
240 Clip
261, 262, 263 AV streams
271, 272 Content management units (CPS units)
281 Data area
310 Information recording medium 311 MKB
312 Title key file
313 Encrypted content
314 Fix-up table
315 Data transform program
330 Drive
350 Host
351 Device key
352 Track buffer
353 Plain TS buffer
354 Event handler
355 Player information
356 Secure VM
361 Real-time event handler
363 Partial table storage unit
364 Pre-load table storage unit
371 SP register
372 XORed table storage unit
391, 392 TS packets
394, 395 Packet having recording area of transform data
401 Track buffer storage data
402 Decrypted data
403 Broken data
404 Transform data
405 Transform data with identification mark
406 Transformed data
501, 502, 511, 512 Packets
800 Information processing apparatus
801 Bus
802 Input and output I/F
803 MPEG codec
804 Input and output I/F
805 A/D, D/A converters
806 TS/PS processor
807 Encrypt processor
808 ROM
810 Memory
811 Drive
812 Recording medium

What is claimed:

1. An information processing apparatus for playing back a content recorded on an information recording medium, comprising:
a data transform processor performing a substitution process on content member data recorded on the information recording medium,
wherein the data transform processor substitutes transform data as substitute data for the content member data in accordance with acquired holding recording position information of the transform data stored in a fix-up table,
wherein the data transform processor further successively acquires divisional fix-up tables distributed in member packets of the content recorded on the information recording medium, and acquires, from the divisional fix-up tables, the transform data as the substitute data corresponding to a part of the member data of the content, and the recording position information of the transform data and acquires a type identifier identifying which of information (a) or information (b) is included in the divisional fix-up tables, wherein information (a) relates to the data for substituting the content member data into the transform data and information (b) relates to the data for substituting the content member data into an identification mark for embedding identification information,
wherein the data transform processor changes and performs the substitution process based on the type identifier.

2. The information processing apparatus according to claim 1, wherein the data transform processor substitutes the transform data composed of authorized content data for broken data different from an authorized content recorded on the information recording medium.

3. The information processing apparatus according to claim 1, wherein the data transform processor substitutes, for a portion of the content recorded on the information recording medium, the transform data containing data for analyzing member bits of identification information identifying one of a content playback apparatus and a content playback application program.

4. The information processing apparatus according to claim 1, wherein the data transform processor acquires the transform data as the substitute data by performing one of a calculation process and an encryption process, the one of the calculation process and the encryption process applying different parameters to partial fix-up tables that hold the transform data corresponding to only a part of the member data of the content.

5. The information processing apparatus according to claim 1, wherein the data transform processor acquires the transform data as the substitute data by performing an exclusive OR gating process with different parameters applied to partial fix-up tables that hold the transform data corresponding to only a part of the member data of the content.

6. The information processing apparatus according to claim 5, wherein the data transform processor performs a calculation process of calculating the different parameters as an intermittent process in synchronization with one of a playback process of playing back the content and an output process of outputting the content to the outside, and acquires the transform data corresponding to different content member data through one of the calculation process and the encryption process performed in accordance with the intermittently calculated different parameters.

7. The information processing apparatus according to claim 5, wherein the data transform processor performs the parameter calculation process using a virtual machine.

8. The information processing apparatus according to claim 1, wherein the data transform processor acquires the fix-up table from the information recording medium having the content recorded thereon, and analyzes, based on the fix-up table, the transform data as the substitute data, and the recording position information of the transform data.

9. The information processing apparatus according to claim 1, further comprising a decrypt processor for executing a decryption process on the content recorded on the information recording medium, wherein the data transform processor substitutes the transform data for the content member data of a decrypted content from the decrypt processor.

10. An information recording medium manufacturing apparatus for manufacturing an information recording medium, comprising:
a data processor for generating a content containing broken data different from authorized content member data, a fix-up table holding transform data as the authorized content member data that is to be substituted for the broken data, and having setting position information regarding the content of the transform data, and a data transform program containing an execution command of executing a substitution process on the content member data with the fix-up table applied, and a data recorder for recording the content containing the broken data, the fix-up table, and the data transform program onto an information recording medium, wherein the data transform program further acquires successively divisional fix-up tables distributed in member packets of the content recorded on the information recording medium, and acquiring, from the divisional fix-up tables, the transform data as the substitute data corresponding to a part of the member data of the content, and the recording position information of the transform data and acquires a type identifier identifying which of information (a) or information (b) is included in the divisional fix-up tables, wherein information (a) relates to the data for substituting the content member data into the transform data and information (b) relates to the data for substituting the content member data into an identification mark for embedding identification information, wherein the data transform program changes and performs the substitution process based on the type identifier.

11. The information recording medium manufacturing apparatus according to claim 10, wherein the data processor generates the fix-up table holding the transform data therewithin selectively applied based on identification information of one of a content playback apparatus and a content playback application program, and wherein the data recorder records the fix-up table holding the transform data that is selectively applied based on the identification information.

12. The information recording medium manufacturing apparatus according to claim 10, wherein the data processor generates the fix-up table that is obfuscated using one of a calculation process and an encryption process, the one of the calculation process and the encryption process applying different parameters to partial fix-up tables that hold the transform data corresponding to only a part of the member data of the content, and wherein the data recorder records the obfuscated fix-up table.

13. The information recording medium manufacturing apparatus according to claim 12, wherein the data processor generates content data in which the obfuscated fix-up table is dispersed in stream packets of the content containing the broken data, and wherein the data recorder records the content data containing the obfuscated fix-up table dispersed therewithin.

14. An information processing method of playing back a content recorded on an information recording medium, comprising:

a data transform processing step of performing, by a processor, a substitution process on content member data recorded on the information recording medium, wherein the data transform processing step includes substituting transform data as substitute data for the content member data in accordance with holding recording position information of the transform data acquired from a fix-up table, wherein the data transform processing step comprises acquiring successively divisional fix-up tables distributed in member packets of the content recorded on the information recording medium, and acquiring, from the divisional fix-up tables, the transform data as the substitute data corresponding to a part of the member data of the content, and the recording position information of the transform data and acquires a type identifier identifying which of information (a) or information (b) is included in the divisional fix-up tables, wherein information (a) relates to the data for substituting the content member data into the transform data and information (b) relates to the data for substituting the content member data into an identification mark for embedding identification information, wherein the data transform processing step changes and performs the substitution process based on the type identifier.

15. The information processing method according to claim 14, wherein the data transform processing step comprises substituting the transform data composed of authorized content data for broken data different from an authorized content recorded on the information recording medium.

16. The information processing method according to claim 14, wherein the data transform processing step comprises substituting, for a portion of the content recorded on the information recording medium, the transform data containing data for analyzing member bits of identification information identifying one of a content playback apparatus and a content playback application program.

17. The information processing method according to claim 14, wherein the data transform processing step comprises acquiring the transform data as the substitute data by performing one of a calculation process and an encryption process, the one of the calculation process and the encryption process applying different parameters to partial fix-up tables that hold the transform data corresponding to only a part of the member data of the content.

18. The information processing method according to claim 14, wherein the data transform processing step comprises acquiring the transform data as the substitute data by performing an exclusive OR gating process with different parameters applied to partial fix-up tables that hold the transform data corresponding to only a part of the member data of the content.

19. The information processing method according to claim 18, wherein the data transform processing step comprises performing a calculation process of calculating the different parameters as an intermittent process in synchronization with one of a playback process of playing back the content and an output process of outputting the content to the outside, and acquiring the transform data corresponding to different content member data through one of the calculation process and the encryption process performed in accordance with the intermittently calculated different parameters.

20. The information processing method according to claim 18, wherein the data transform processing step comprises performing the parameter calculation process using a virtual machine.

21. The information processing method according to claim 14, wherein the data transform processing step comprises acquiring the fix-up table from the information recording medium having the content recorded thereon, and analyzing, based on the fix-up table, the transform data as the substitute data, and the recording position information of the transform data.

22. The information processing method according to claim 14, further comprising a decrypt processing step of executing a decryption process on the content recorded on the information recording medium, wherein the data transform processing step comprises substituting the transform data for the content member data of the content decrypted in the decrypt processing step.

23. An information recording medium manufacturing method of manufacturing an information recording medium, comprising:

a data processing step of generating, by a processor, a content containing broken data different from authorized content member data, a fix-up table holding transform data as the authorized content member data that is to be substituted for the broken data, and having setting position information regarding the content of the transform data, and a data transform program containing an execution command of executing a substitution process on the content member data with the fix-up table applied, and a data recording step of recording, by a recording unit, the content, containing the broken data, the fix-up table, and the data transform program onto an information recording medium, wherein the data transform program further acquires successively divisional fix-up tables distributed in member packets of the content recorded on the information recording medium, and acquiring, from the divisional fix-up tables, the transform data as the substitute data corresponding to a part of the member data of the content, and the recording position information of the transform data and acquires a type identifier identifying which of information (a) or information (b) is included in the divisional fix-up tables, wherein information (a) relates to the data for substituting the content member data into the transform data and information (b) relates to the data for substituting the content member data into an identification mark for embedding identification information, wherein the data transform program changes and performs the substitution process based on the type identifier.

24. The method according to claim 23, wherein the data processing step comprises generating the fix-up table holding the transform data therewithin selectively applied based on identification information of one of a content playback apparatus and a content playback application program, and wherein the data recording step comprises recording the fix-up table holding the transform data that is selectively applied based on the identification information.

25. The information recording medium manufacturing method according to claim 23, wherein the data processing step comprises generating the fix-up table that is obfuscated using one of a calculation process and an encryption process, the one of the calculation process and the encryption process applying different parameters to partial fix-up tables that hold the transform data corresponding to only a part of the member data of the content, and wherein the data recording step comprises recording the obfuscated fix-up table.

26. The information recording medium manufacturing method according to claim 25, wherein the data processing step comprises generating content data in which the obfuscated fix-up table is dispersed in stream packets of the content containing the broken data, and wherein the data recording step comprises recording the content data containing the obfuscated fix-up table dispersed therewithin.

27. A non-transitory computer readable storage medium comprising:

computer readable and executable instructions that when executed by a processor cause an information processing apparatus to play back a content recorded on an information recording medium, and to execute a data transform processing step of performing a substitution process on content member data recorded on the information recording medium, wherein the data transform processing step includes substituting transform data as substitute data for the content member data in accordance with holding recording position information of the transform data acquired from a fix-up table, wherein the data transform processing step comprises acquiring successively divisional fix-up tables distributed in member packets of the content recorded on the information recording medium, and acquiring, from the divisional fix-up tables, the transform data as the substitute data corresponding to a part of the member data of the content, and the recording position information of the transform data and acquires a type identifier identifying which of information (a) or information (b) is included in the divisional fix-up tables, wherein information (a) relates to the data for substituting the content member data into the transform data and information (b) relates to the data for substituting the content member data into an identification mark for embedding identification information, wherein the data transform processing step changes and performs the substitution process based on the type identifier.

* * * * *